United States Patent
Smith et al.

(10) Patent No.: US 11,408,392 B2
(45) Date of Patent: Aug. 9, 2022

(54) INSERT AND BLANK FOR A WIND TURBINE BLADE ROOT

(71) Applicant: Vestas Wind Systems A/S, Aarhus N. (DK)

(72) Inventors: Jonathan Smith, Burridge (GB); James Smith, Ryde (GB); Robert Ernst, Århus C (DK); Mark Folsom, Longmont, CO (US)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 16/770,116

(22) PCT Filed: Dec. 7, 2018

(86) PCT No.: PCT/DK2018/050334
§ 371 (c)(1),
(2) Date: Jun. 5, 2020

(87) PCT Pub. No.: WO2019/110071
PCT Pub. Date: Jun. 13, 2019

(65) Prior Publication Data
US 2020/0392936 A1    Dec. 17, 2020

Related U.S. Application Data

(60) Provisional application No. 62/596,260, filed on Dec. 8, 2017.

(30) Foreign Application Priority Data

Jan. 11, 2018   (DK) ............................ PA 2018 70017

(51) Int. Cl.
    *F03D 1/06*           (2006.01)

(52) U.S. Cl.
    CPC ........ *F03D 1/0658* (2013.01); *F05B 2230/50* (2013.01); *Y02E 10/72* (2013.01)

(58) Field of Classification Search
    CPC ...... F03D 1/0658; F03D 1/065; F03D 1/0675; F03D 1/0683; F05B 2230/50; Y02E 10/72; Y02P 70/50
    See application file for complete search history.

(56) References Cited

U.S. PATENT DOCUMENTS 7,163,378 B2 *  1/2007  Kildegaard ........... B29C 70/525
                                                    416/230
9,995,271 B2 *  6/2018  Dahl .................... F03D 1/0675
                        (Continued)

FOREIGN PATENT DOCUMENTS

CN     106739022 A     5/2017
EP     2551512 A1      1/2013
                (Continued)

OTHER PUBLICATIONS

Danish Patent and Trademark Office, Search and Examination Report in PA 2018 70017, dated Jul. 13, 2018.
                (Continued)

*Primary Examiner* — Ryan J. Walters
(74) *Attorney, Agent, or Firm* — Wood Herron & Evans LLP

(57) ABSTRACT

A composite material blank (190) comprising an elongate blank body (300) extending between a first end face (312*a*) and a second end face (312*b*); said blank body (300) extending in a longitudinal direction, parallel to a longitudinal axis thereof, and having four peripheral sides (341, 342, 343, 344); each said first and second end face (312*a*, 312*b*) having edges (361*a*-364*a*; 361*b*-364*b*) which define a trapezoid shape; wherein the peripheral sides (341, 342, 343, 344) of said blank body (190) connect the edges (361*a*-364*a*) of said first end face (312*a*) with the edges (361*b*-

(Continued)

364b) of said second end face (312b); and wherein said first trapezoid end face (312a) is inverted in relation to said second trapezoid end face (312b). A method of manufacturing a composite blank (190), and a wind turbine blade root insert (105) which may be formed from a blank (190).

9 Claims, 16 Drawing Sheets

(56) References Cited

U.S. PATENT DOCUMENTS

| | | | |
|---|---|---|---|
| 10,190,571 B2* | 1/2019 | Samudrala | F03D 1/0658 |
| 2014/0030094 A1* | 1/2014 | Dahl | B29C 70/885 |
| | | | 416/217 |
| 2014/0140853 A1* | 5/2014 | Feigl | F03D 1/0658 |
| | | | 416/222 |
| 2014/0178205 A1 | 6/2014 | Nanukuttan et al. | |
| 2014/0234109 A1* | 8/2014 | Hayden | F03D 3/064 |
| | | | 416/204 R |
| 2015/0165700 A1 | 6/2015 | Thorning et al. | |
| 2015/0233260 A1* | 8/2015 | Garm | F03D 80/70 |
| | | | 416/204 A |
| 2020/0347820 A1* | 11/2020 | Smith | F03D 1/0658 |

FOREIGN PATENT DOCUMENTS

| | | |
|---|---|---|
| EP | 2697045 B1 | 8/2015 |
| EP | 2952735 A1 | 12/2015 |

OTHER PUBLICATIONS

European Patent Office, International Search Report and Written Opinion in PCT Application No. PCT/DK2018/050334, dated Mar. 13, 2019.

* cited by examiner

INSERT AND BLANK FOR A WIND TURBINE BLADE ROOT

FIELD OF THE INVENTION

The present invention relates to an insert for a wind turbine blade root, a method of manufacturing such an insert, a blank in a method of manufacturing inserts for a wind turbine blade root, and a method of manufacturing such a blank.

BACKGROUND OF THE INVENTION

US2011044817 relates to a process for manufacturing a blade connection of a rotor blade for a wind energy system which comprises fastening elements for fastening the blade connection to a hub. The fastening elements are provided on a circular arc, preferably equidistant from each other, and spaced from each other with wedge-shaped spacer elements.

A wind turbine blade for a large horizontal axis wind turbine may have significant mass, perhaps in the region of 10 tonnes or more, up to 30 tonnes or more. Blades are fastened to a hub to make up a rotor. A rotor rotates on a main shaft to drive a generator. Blades are attached at their root end to a hub flange. A blade is typically connected to a hub flange using a group of bolts. The stresses on a blade hub connection are considerable, owing chiefly to blade mass and wind force, as well as the effect of perpetual rotation of the rotor, which tends to vary the degree and direction of the forces on the blade with every rotation of the rotor. Vibrations in the system can also be considerable. With an expected lifetime of 20 years and more, the fatigue performance of the blade hub connection is critical. A bolt group, often known as stud bolts, may be connected to the blade root using threaded bushings, embedded into the root end of a blade. Such bushings are usually cylindrical, often made of steel. The bushings transfer the loads from the blade to the stud bolts. The stud bolts transfer those loads to the hub, which is a rigid, often cast, component. Considering the fatigue requirements placed on a blade hub connection, the manner of embedding bushings into a blade root can be critical. The present invention addresses the design of an insert, into which a bushing may be embedded, and methods of preparing the same. The insert, generally made from composite material and containing a bushing, may be embedded in a blade root along with other inserts. The blade root, with its inserts, thereby presents a connection face for a bolted connection to a hub.

SUMMARY OF THE INVENTION

A first aspect of the invention provides a composite material blank in a method of manufacturing a pair of inserts for a wind turbine blade root, the blank comprising an elongate blank body extending between a first end face and a second end face. The blank body extends in a longitudinal direction, parallel to a longitudinal axis thereof, and has four peripheral sides; each said first and second end face having edges which define a trapezoid shape; wherein the peripheral sides of said blank body connect the edges of said first end face with the edges of said second end face and wherein said first trapezoid end face is inverted in relation to said second trapezoid end face. By inverted is meant that the second end face is turned through 180 degrees in relation to the first end face. The blank may thereby exhibit two opposing, parallel, planar faces and two non-parallel side faces. The side faces may be non-planar or partially planar. The blank may be shaped such that it may be bisected into two equal parts by a single plane. In other words, the blank may preferably be shaped to generate two identically dimensioned parts, when bisected along a plane transverse, and preferably perpendicular to the blank's lengthwise axis. Preferably, the blank is a composite material blank in a method for manufacturing two wind turbine blade root inserts simultaneously. Therefore, the blank may preferably comprise a first and a second wind turbine blade root bushing. A bushing may be cylindrical. A cylindrical bushing may extend about a longitudinal axis parallel with or coincident with the longitudinal axis of said blank. A bushing may be a metal bushing, preferably a steel bushing. A bushing may preferably comprise an attachment region for engagement of the bushing with a wind turbine hub connection element. A bushing attachment region may comprise a bore. A bore may include a threaded portion. A wind turbine hub connection element may comprise a stud bolt. A stud bolt may be attachable to a bushing by engagement of a threaded portion of the stud bolt with a threaded portion of a bushing bore. Preferably the first and second bushings are arranged in opposition to each other in the blank.

The blank may comprise a first end portion and a second end portion. In particular, said blank body may comprise a first end portion and a second end portion. Preferably, a first bushing may be embedded in a first end portion of a said blank, while a second bushing may be embedded in a second end portion of said blank. Therefore, the blank may comprise first and second end portions each having a respective bushing. In embodiments, along said first and second end portions, in a length direction of said blank, the four peripheral sides of said blank body may all be planar and extend parallel to the longitudinal axis of said blank body. The blank body may have a generally quadrilateral cross section along all or part of its length. The blank may further include a transition portion in which said side faces of said blank body are not parallel to said longitudinal axis. In embodiments, the blank body may extend along a transition portion, between said first end portion and said second end portion. A bisection of the blank may generate two wind turbine blade root inserts of equal dimensions.

At each end portion the peripheral faces of said elongate blank body may include a major face, a minor face and a pair of side faces, the major face being wider than the minor face. The blank body may be an elongate quadrilateral shape resembling a prism. The blank body may have a top surface and an opposing bottom surface which are generally planar. The blank body top and bottom surfaces may preferably be generally parallel.

As mentioned, the first aspect of the invention provides an intermediate product, or blank. The blank can be cut into two, to generate two inserts. When laid in side-by side abutment in a blade mould, the inserts preferably describe a circular section, preferably without requiring an additional wedge-shaped spacer element.

Preferably the blank body portion comprises two end portions separated by a transition portion. The transition portion may exhibit a pair of side faces. Each side face of said transition portion may meet a side face of the respective first and second end portions. Each side face may be non-planar. Preferably, each side face may be predominantly planar and marginally non-planar. In embodiments, each side face of the transition portion may comprise two or more substantially planar facets. Alternatively, each side face of the transition portion may be curved.

The blank preferably has rotational symmetry of order 2. The blank may be cut in half along a diagonal line to form a pair of matching inserts.

The two respective bushings may be embedded into a blank. The bushings may be cylindrical. A bushing may be embedded into each end region of said blank. A bushing may protrude slightly from an end face of said blank. Typically the bushings may be separated by a longitudinal, cylindrical core. A core may be non-metallic and may be fibrous for example or made from a bulk material such as foam or balsa. Optionally the blank may further comprise two or more fibrous battens surrounding the bushings and the core. Each batten may have a deltoid cross-section. The battens may thereby give the elongate blank a generally quadrilateral cross-section.

The side faces may be slightly curved. More preferably, they may be partly planar, preferably so that the inserts generated therefrom may form a continuous ring when the planar side faces of adjacent inserts are laid side-by-side, in contact with each other.

In one embodiment the cross-section of each end portion of the blank has a pair of straight, opposing, parallel faces and a pair of opposing sides which are nearly parallel but which lie on slightly convergent planes. More preferably the cross section of each end portion of the blank is a trapezoidal cross-section.

Optionally each end portion of the blank has a prismatic shape. In this case the cross-section of each end portion does not vary along a longitudinal axis of the blank.

Preferably, a transition portion between the end portions of the blank may have a cross-section which varies along the longitudinal axis of the blank. Preferably, a cross section of the transition portion may be generally quadrilateral, although in some embodiments, the side faces in particular may be slightly concave.

The invention also provides a method of manufacturing a pair of inserts for a wind turbine blade root, the method comprising: producing a blank according to the first aspect of the invention; and cutting the blank into two equal pieces by making a diagonal cut through the blank body. In embodiments, a diagonal cut may be made through the transition portion. In embodiments, a diagonal cut through the blank may be entirely in the transition portion. The diagonal cut may define a plane which passes transversely across opposing parallel faces of the blank body, and which passes diagonally across opposing side faces of said blank body.

The invention also provides a method of manufacturing the blank, the method comprising; placing an assembly in an infusion mould; injecting a matrix material into the infusion mould so that the matrix material infuses the assembly; curing the matrix material; and after the matrix material has cured, removing the blank from the infusion mould.

In one example the infusion mould comprises first and second mould parts which meet at a split line; wherein each of said first and second mould parts respectively moulds two principal surfaces of said blank; wherein said first mould part moulds one of two opposing side faces of said blank and one of two opposing parallel faces of said blank, while said second mould part moulds the other of said two opposing side faces of said blank and the other of said two opposing parallel faces of said blank. Optionally, each mould part may mould a portion of each end face of said blank. Preferably the mould split describes a diagonal plane through the generally quadrilateral cross-section of said blank body. This arrangement may be called a diagonal split mould. This diagonal split mould arrangement enables the cured blank to be removed easily from the mould.

Typically the assembly may be formed by fitting the bushings to opposite ends of a core, and fitting two or more fibrous battens around the bushings and the core. Each batten may have a deltoid cross-section so that the battens give the blank assembly a quadrilateral cross-section (typically rectangular or trapezoid), and the matrix material infuses the fibrous battens in the infusion mould.

A further aspect of the invention provides an insert for a wind turbine blade root, the insert comprising: an end portion comprising a bushing with a threaded bore, wherein the end portion has peripheral faces which form a cross-section, the peripheral faces including a major face, a minor face and a pair of side faces, the major face being wider than the minor face; and an extension portion which extends away from the end portion to a tip; wherein the extension portion has an outer face which meets the major face of the end portion, an inner face which meets the minor face of the end portion, a pair of side faces which meet the side faces of the end portion, and a height between its inner and outer faces which reduces as it extends away from the end portion, wherein a width of the outer face reduces as the extension portion extends away from the end portion. The blank generated by a method according to this disclosure may be generally prismatic and may have a predominantly quadrilateral cross-section. Therefore, the extent of the narrowing of an insert away from its end portion may be in the order of just a few millimetres from the end portion to a tip of the extension portion; possibly just one or two millimetres. Possibly three or four millimetres.

Cutting the blank into two parts typically produces a pair of equal, matching inserts according to the further aspect of the invention. The insert has a height and a width which both taper inwardly towards the tip.

The height may reduce in a series of steps or in another non-uniform way, but more preferably it reduces uniformly as the extension portion extends away from the end portion.

The inner face is preferably planar. This enables the inner face to be formed easily, for example by cutting the blank with a cutting implement such as rotary saw.

Each side face of the extension portion may comprise one or more substantially planar facets. Alternatively, each side face of the extension portion may be curved.

The side faces of the end portion of an insert may be curved, but more preferably they may be planar so that multiple inserts, when arranged side-by-side, form a continuous ring with the planar side faces of adjacent inserts in contact with each other.

The parallel, opposing major and minor faces of the end portion may preferably be planar and preferably flat.

Preferably an end portion of the insert has a polygonal cross-section with substantially straight sides—for instance it may have a trapezoid cross-section with four substantially straight sides. Alternatively, the cross-section of the end portion of the insert may have one or more curved sides.

In one embodiment the cross-section of the end portion of the insert has a pair of straight sides which are nearly parallel but which are slightly convergent.

Optionally an end portion of the insert has a prismatic shape in which all sides are parallel to the blank longitudinal axis. In this case the cross-section of each end portion does not vary along a longitudinal axis of the blank. By contrast, a transition portion of said blank may have an almost prismatic shape, in other words a transition portion may have a cross-section which varies along the longitudinal axis of the insert.

A further aspect of the invention provides a wind turbine blade comprising: a root and a tip, the wind turbine blade extending from the root to the tip; and a plurality of inserts according to the further aspect of the invention embedded in the root.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
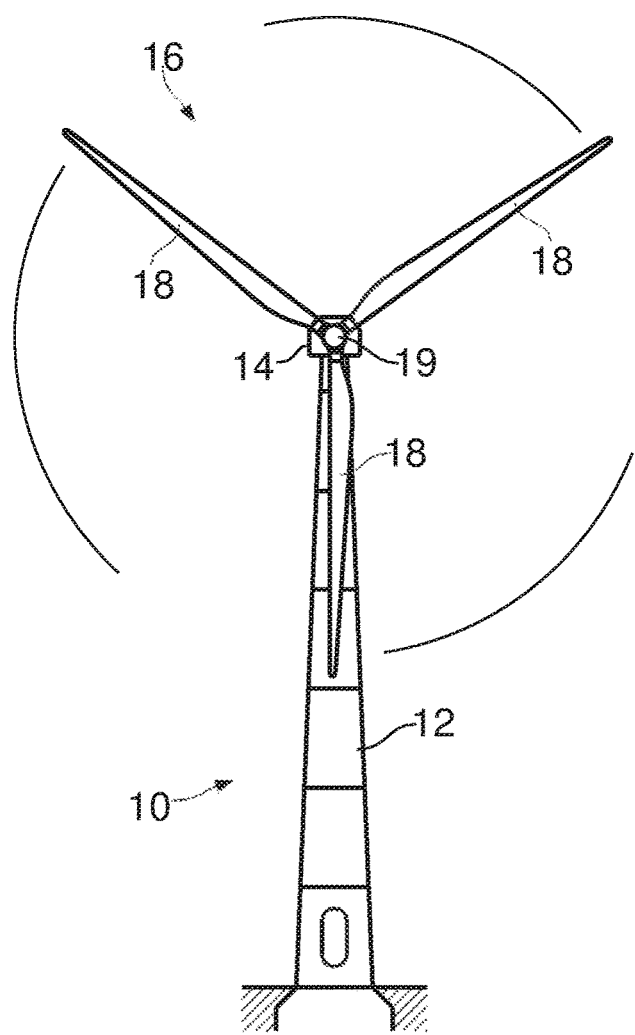
FIG. 1 shows a wind turbine.

FIG. 1 shows a horizontal axis wind turbine 10. The wind turbine 10 comprises a tower 12 supporting a nacelle 14 to which a rotor 16 is mounted. The rotor 16 comprises a plurality of wind turbine blades 18 that extend radially from a central hub 19. In this example, the rotor 16 comprises three blades 18.

Figure 2:
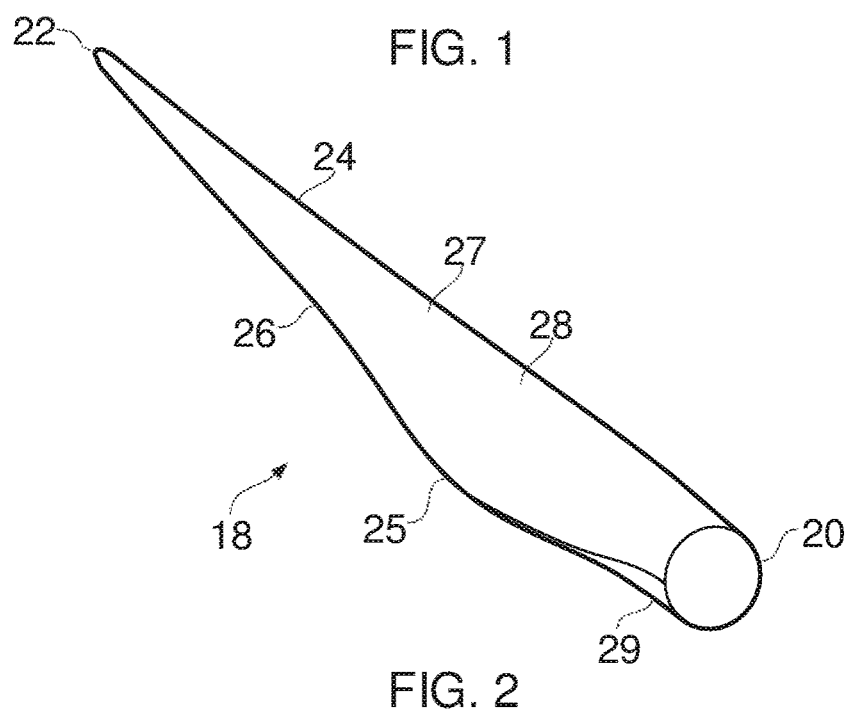
FIG. 2 shows a blade of the wind turbine of FIG. 1.

FIG. 2 is a view of one of the blades 18. The blade 18 extends from a generally circular root 20 to a tip 22 in a longitudinal 'spanwise' direction, and between a leading edge 24 and a trailing edge 26 in a transverse 'chordwise' direction. The blade 18 comprises a shell 27 which may be formed primarily of fibre-reinforced plastic (FRP). The blade 18 comprises a suction surface 28 and a pressure surface 29. The suction and pressure surfaces define a thickness dimension of the blade.

The blade 18 transitions from a circular profile to an airfoil profile moving from the root 20 of the blade 18 towards a shoulder 25 of the blade 18, which is the widest part of the blade 18 where the blade has its maximum chord. The blade 18 has an airfoil profile of progressively decreasing thickness in an outboard portion of the blade 18, which extends from the shoulder 25 to the tip 22 of the blade 18.

Figure 3:
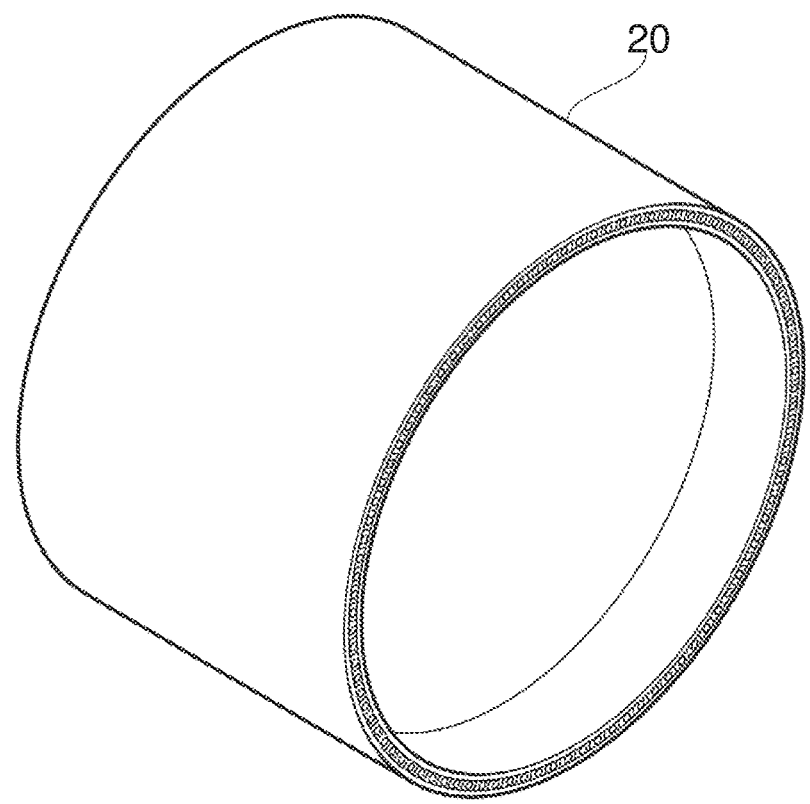
FIG. 3 shows a root end of the blade of FIG. 2.
Figure 4:
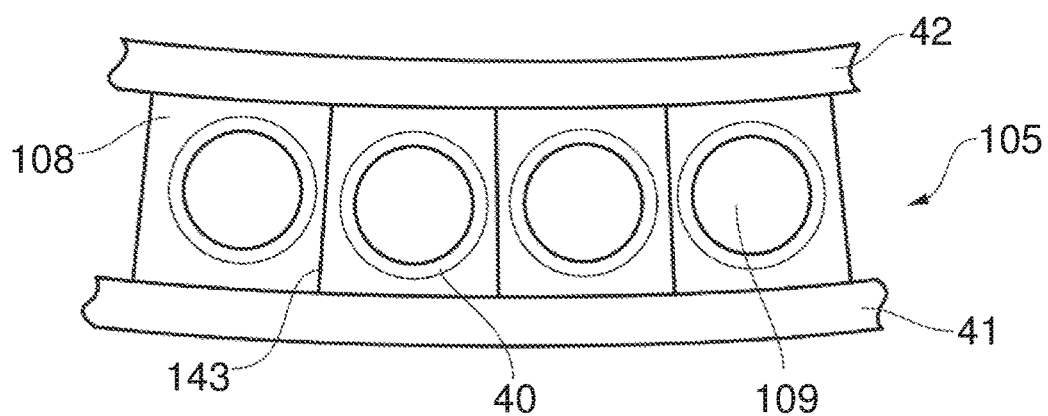
FIG. 4 is an enlarged end view of part of the root end of FIG. 3.
Figure 5:
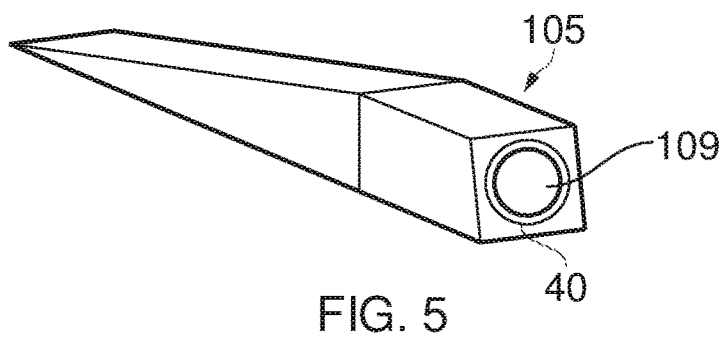
FIG. 5 shows a wind turbine blade root insert.

FIG. 3 shows the root 20 of one of the blades 18, and FIG. 4 is an end view of a sector of the root 20. The root 20 is preferably attached to the hub 19 by stud-bolts (not shown) which may extend from or through a hub flange (not shown) into metal bushings 40, four of which are shown in FIG. 4. Each bushing extends in a longitudinal direction and has an internal axial bore 109. Each steel bushing 40 may be embedded in an insert 105 shown in FIG. 5. The insert 105 has an insert body 108 in which the bushing 40 is embedded. The inserts 105 may have a quadrilateral, preferably trapezoidal, cross section and may be laid side by side in a ring around the circumference of the root 20. The inserts 105 may be embedded between walls 41 and 42. These walls 41 and 42 may in particular be of glass fibre reinforced composite material. In the illustrated embodiment, composite wall 41 forms an outside layer of the shell 27 at the blade root 20 while composite wall 42 forms an inside layer of the shell 27 at the root 20. The inserts 105 may be placed in a mould and then integrated with the blade shell 27 through a resin infusion moulding process such as vacuum infusion. To achieve this, the inserts 105 may be pre-manufactured and laid into the mould by positioning them on lay-up material for the shell 27. Additional lay-up material may be applied over the inserts 105 in the mould, prior to infusion.

Note that in embodiments, the side faces 143 of the inserts 105 are preferably planar so that the inserts 105 can be arranged, as shown in FIG. 4, in a continuous ring with the planar side faces 143 of adjacent inserts 105 in abutting contact with each other. If the inserts 105 have a slightly trapezoidal shape, then the respective side faces 143 may be arranged side-by-side to form a circular arrangement as illustrated in FIGS. 3 and 4, without requiring wedge-shaped spacers between them.

Figure 6A:
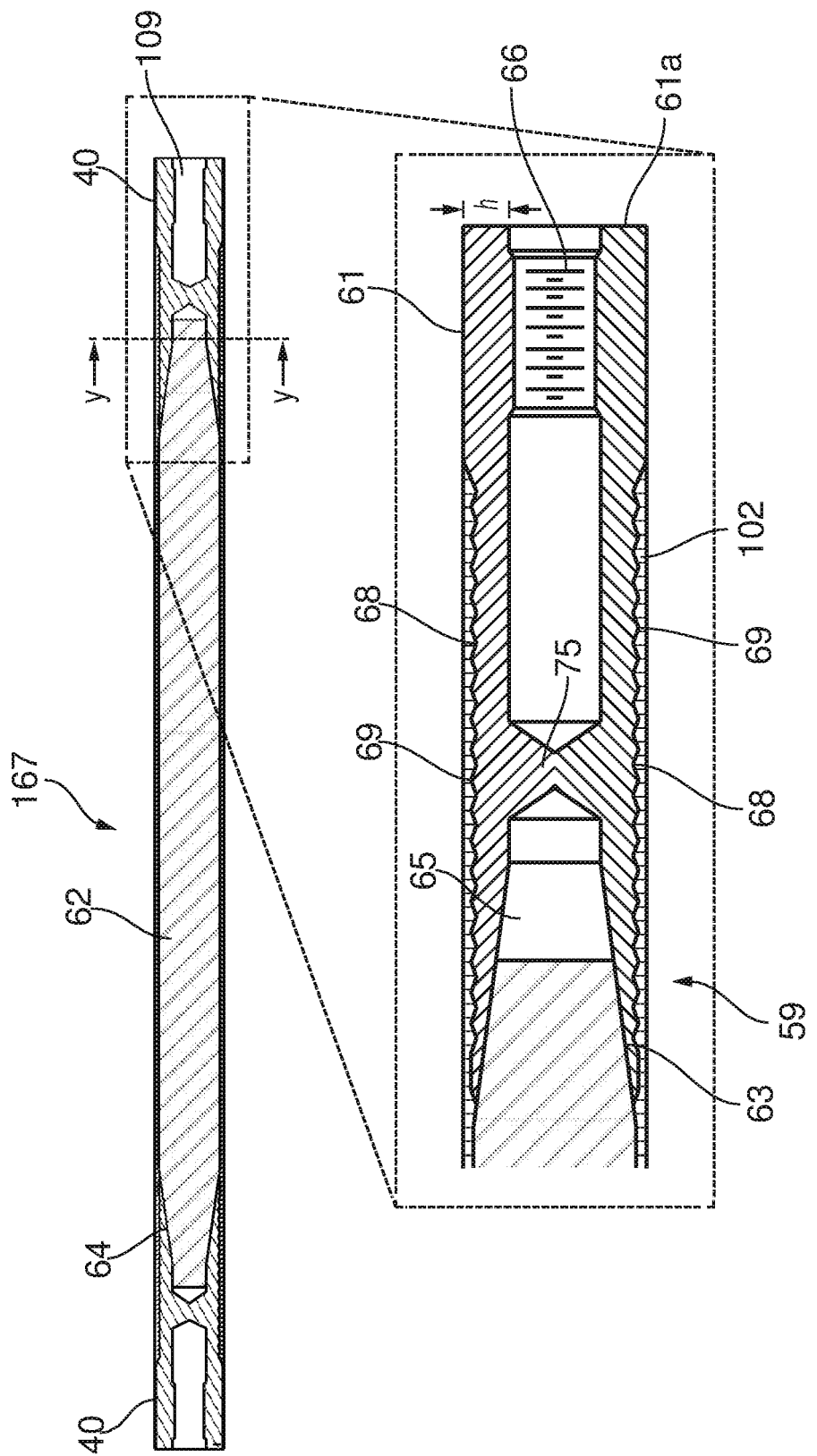
FIG. 6a is a cross-sectional view along the length of a double-ended spindle assembly, wrapped with a transition layer.

Aspects of a preferred method of manufacturing a matching pair of the inserts 105 are shown in FIGS. 6a to 16. First, a double-ended spindle 167 may be set up, onto which a transition layer 102 may be made up. Advantageously, two bushings 40 may be longitudinally spaced at either end of a longitudinal core 62 to form the spindle 167. The illustrated spindle 167 comprises a core 62 with frustoconical ends 63, and a pair of steel bushings 40 which each have frustoconical recesses 65 into which the ends 63 of the core may be push-fitted as shown in FIG. 6a. The core 62 may be made from a variety of materials, such as polyethylene terephthalate (PET) foam, pultruded glass, glass-fibre reinforced composite material, or wood.

Figure 30:
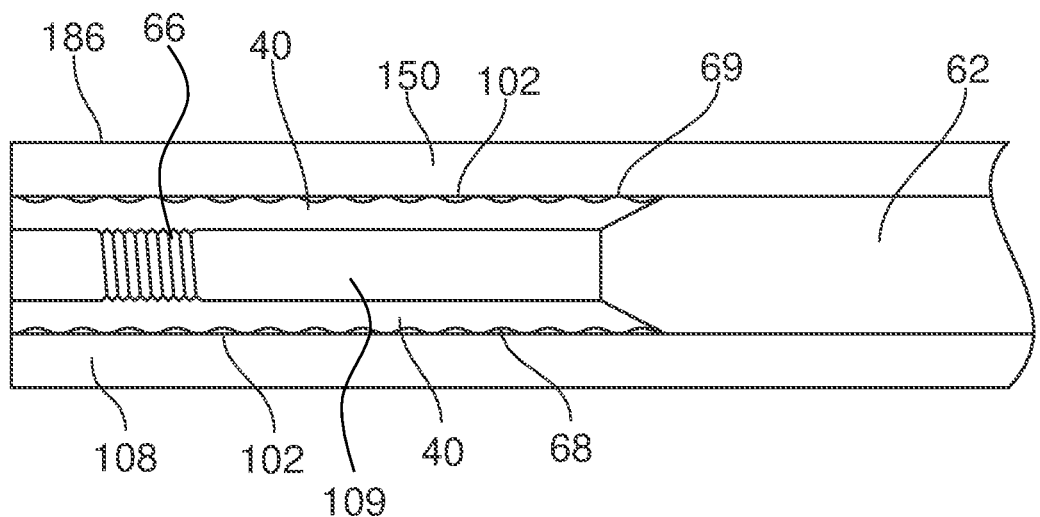
FIG. 30 shows a diagonal cross-sectional view of one end of a blank including an embedded bushing.

With reference to FIG. 30, a bushing 40 may serve both to transfer loads between a hub connection element, such as a stud bolt (not shown), and the bushing 40, as well as to transfer loads between the bushing 40 and the insert body 108, the insert 105 being embedded in a wind turbine blade root 20. For transferring loads between a hub connection element and the bushing 40, the bushing may be provided with an internal bore 109, the internal bore 109 in turn having an engagement element 66 for engagement with a hub connection element (not shown). In the case illustrated, the bushing 40 may have an internal thread 66 for engagement with a stud bolt (not shown), for connection to a wind turbine hub. In addition, the bushing 40 may have a textured external surface (see grooves 68) for improving load transfer between the bushing 40 and the insert body 108. In FIG. 30, the textured outer surface 68 of the bushing 40 extends axially adjacent the engagement element 66. This may serve to maximise the area available on the bushing 40 surface for load transfer to the insert body 108. In other words, the two load transfer arrangements at the bushing 40 may be axially coincident. In order to improve the performance of a bushing 40, it may be desirable to axially separate those areas which perform the respective load transfer functions. Such an axial separation may reduce local peak loads in the bushing 40 and is illustrated by way of example in FIG. 6a. Accordingly, a bushing 40 may include an end region 61 which terminates in a planar end face 61a at a root end of the bushing, and a body region 59 which extends from the end region 61 to the opposite end of the bushing. The end region 61 may be non-textured, i.e. it may have a predominantly smooth outer surface. By smooth is meant predominantly cylindrical, and preferably without external surface features. A smooth surface may be roughened for better adhesion to resin, although such roughening may not be regarded as a surface feature in this context. A body region 59 may be provided with a textured outer surface for engagement between the bushing 40 and the insert body 108. In such an arrangement, with the textured outer surface of the body portion 59 axially offset from the smooth, cylindrical outer surface of the root end region 61, the load transfer between the bushing 40 and the insert body 108 may be localised away from the root end region 61. In embodiments, an internal thread 66 or stud bolt engagement element, may be positioned in a root end region 61 of a bushing 40. In this way, as illustrated in FIG. 6a, load transfer between a hub connection element and the bushing 40, via engagement element 66, may be axially separated from load transfer between the bushing and the insert body 108. This may reduce peak loads experienced by the bushing 40. In embodiments, the root end region 61, axially offset from the body region 59, may exhibit a larger minimum outer diameter than the minimum outer diameter of the end region 61. This arrangement may ensure that, in embodiments where a thread 66 is axially offset from a textured region of a bushing 40, then the bushing 40 has a greater wall thickness in the region of the thread 66 than in the region of the textured outer surface. This, in turn, may improve the ability of the bushing 40 to withstand high levels of stress through the engagement element 66, perhaps especially at momentary high levels of stress.

Optionally therefore, the internal thread 66 in a bore 109 through the bushing 40 may be arranged within the end region 61. The end region 61 may have a smooth (ungrooved) or grooved cylindrical outer surface. The end region 61, offset from the body region 59 may be configured so that so that none of the grooves 68 encircle the internal thread 66. Offsetting the grooves 68 from the thread 66 in this way maximizes the wall thickness of the end region 61, making it crack-resistant. It also separates the bushing 40 into two, axially spaced, functional regions: the end region 61 and the body region 59. The end region 61 transmits loads between the stud bolt and the bushing 40, while the body region 59 transmits loads between the bushing 40 and the insert body 108, via a transition layer 102.

An effective wall thickness h (FIG. 6a) of the bushing 40 may vary between a maximum, measured between the very outer extent of the bushing 40 e.g. at its root end region 61 or at a crest 69 between adjacent grooves and the inner wall of a bore 109, and a minimum extent between the grooves of an internal thread 66 and the grooves 68 of an undulating profile. A greater minimum wall thickness h at the threaded bore makes the area of high load transfer at an end region 61 more stress-resistant.

Figure 8:
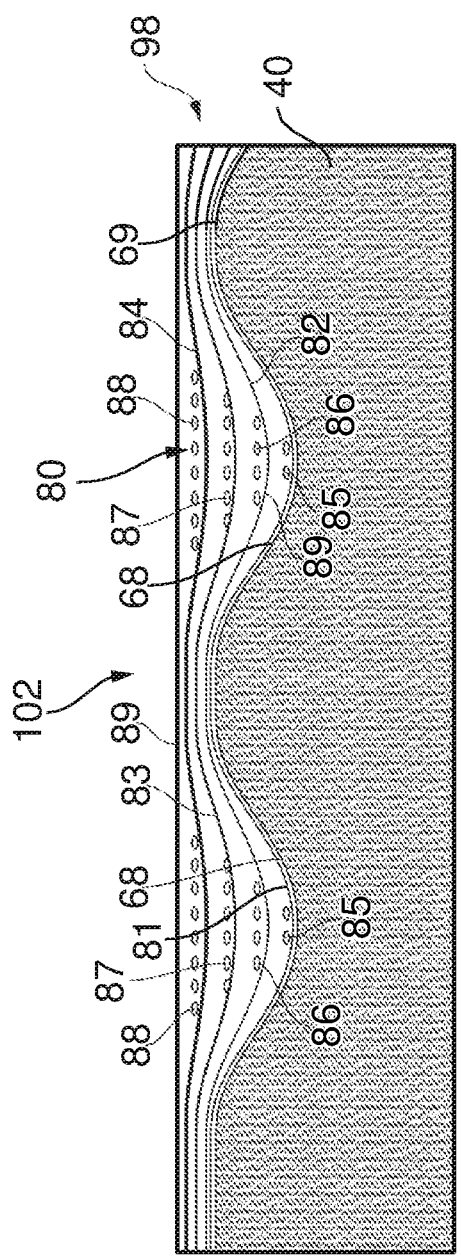
FIG. 8 is a sectional side view showing two grooves and a transition layer covering the grooves.
Figure 7:
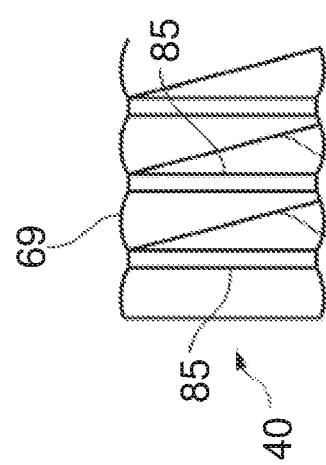
FIG. 7 is a schematic side view of a bushing wrapped in a transition layer and showing connecting sections of filamentary material between adjacent grooves.

FIG. 7 is a side view showing three grooves 68 at a bushing 40 surface. FIG. 8 is a sectional view showing two of the grooves 68. As shown most clearly in FIG. 7, the grooves 68 and ridges 69 are annular rather than helical, so they each lie perpendicular to the length of the spindle 167, i.e. perpendicular to the axial direction of the bushing 40.

After a spindle 167 has been set up, a transition layer 102 may be built up around it as shown in FIG. 8. The transition layer 102 may comprise fibrous plies 98, each overlaid with a respective associated set of windings 80. In the illustrated example in FIG. 8, the transition layer 102 may comprise four fibrous plies 98, each overlaid with a respective associated one of four sets of windings 80. In FIG. 8, the four fibrous plies 98 are individually numbered 81-84, the ply 81 being the innermost ply. The number of fibrous plies 98 may however be two or three or four or five or more. Each ply 98 preferably has its own associated set of windings 80. In FIG. 8, The four sets of windings 80 are individually numbered 85-88, the innermost set of windings 85 being associated with the innermost ply 81. The transition layer 102 may be a continuous layer which terminates at each end of the spindle 167. In embodiments, the transition layer 102 may terminate where a last groove 68 meets the end region 61 of a bushing 40, as shown in FIG. 6a. Alternatively, a respective transition layer 102 may be applied such that it surrounds a respective bushing 40 at either end of said spindle 167.

Figure 11A:
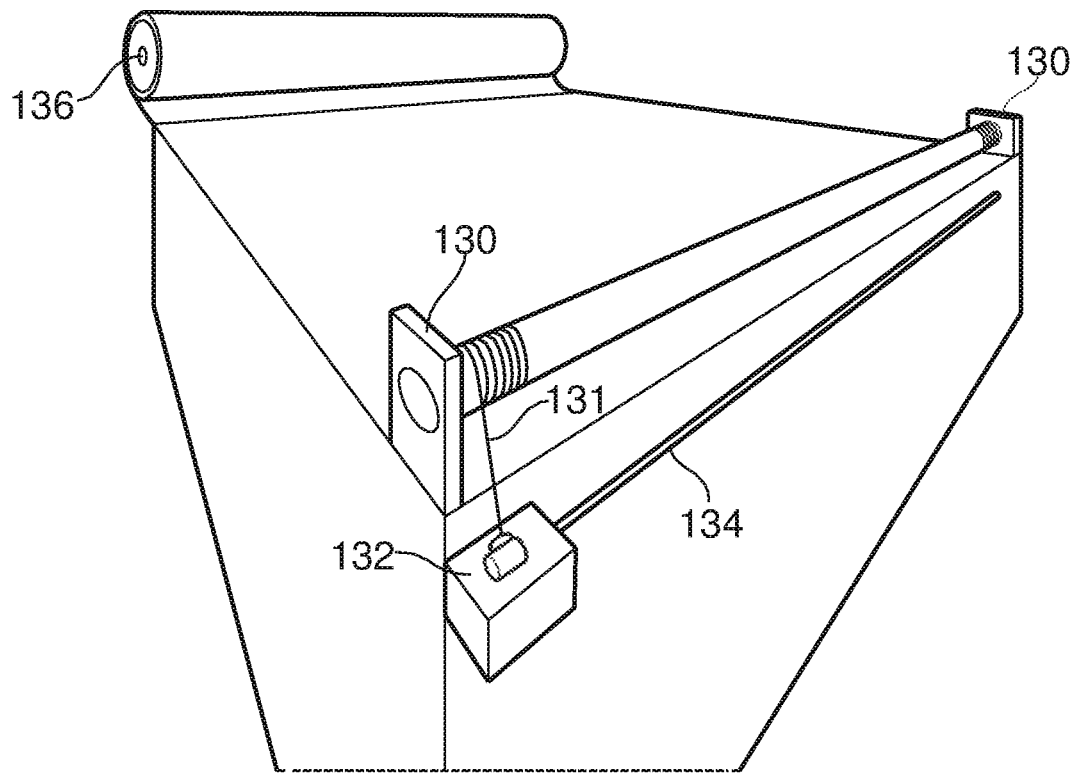
FIG. 11a shows a filamentary material being wound onto a spindle to form a set of windings over a material wrapping layer.
Figure 11B:
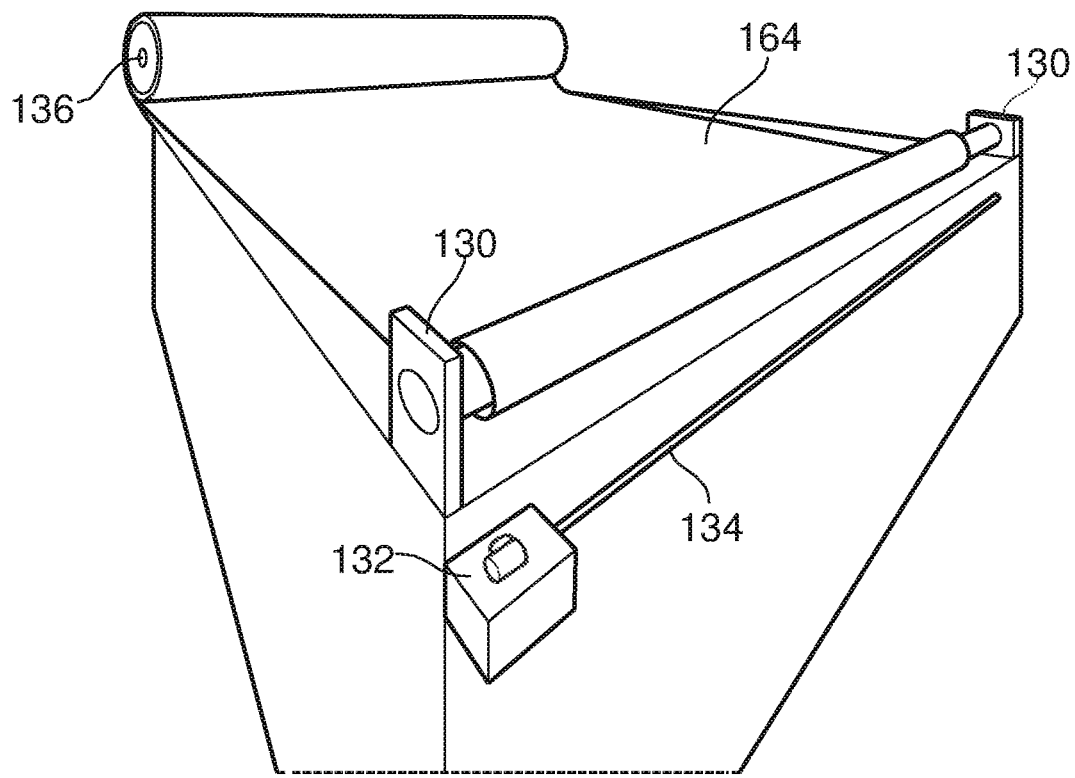
FIG. 11b shows fibrous sheet material being wrapped around a spindle.

The plies 98 may comprise sheets of fibrous sheet material 164, one sheet 164 being shown in FIG. 11b. By way of example the fibrous sheet material 164 may comprise glass fibre or synthetic material fibre such as high tensile polymeric material fibre. The term fibrous is used here although it may include fibrous sheets made of filamentary material such as glassfibre or other extruded type continuous filamentary material. The fibrous sheet material 164 may be selected from combinations of one or more of: unidirectional sheets, biaxial sheets (e.g. +45°/−45°) or tri-axial sheets (e.g. +45°/0°/−45°). By way of example, the fibrous sheet material 164 may be a nonwoven fabric made with unidirectional fibre layers stacked in different orientations and held together by through-thickness stitching. In embodiments, the fibrous sheet material 164 of an outer ply 98 may have a higher basis weight (g/sm) than the fibrous sheet material 164 of an inner ply 98. In a typical construction, the fibrous sheets 164 which make up the plies 98 may have a basis weight between approximately 400 g/sm and 1600 g/sm. By way of example, in one preferred embodiment, the first (innermost) ply 81 may comprise fibrous sheet material 164 in the form of a 600 gram per square meter (g/sm) biaxial sheet (+45°/−45°), while one or more of the other plies 98 may comprise fibrous sheet material 164 in the form of biaxial sheets (+10°/−10°) with a higher weight, such as for example 1200 g/sm. Alternatively, some or all of the plies 98 may be made up of multiple sheets—for example the first (innermost) ply 81 may comprise two sheets with each sheet having a basis weight of 300 g/sm.

Figure 12:
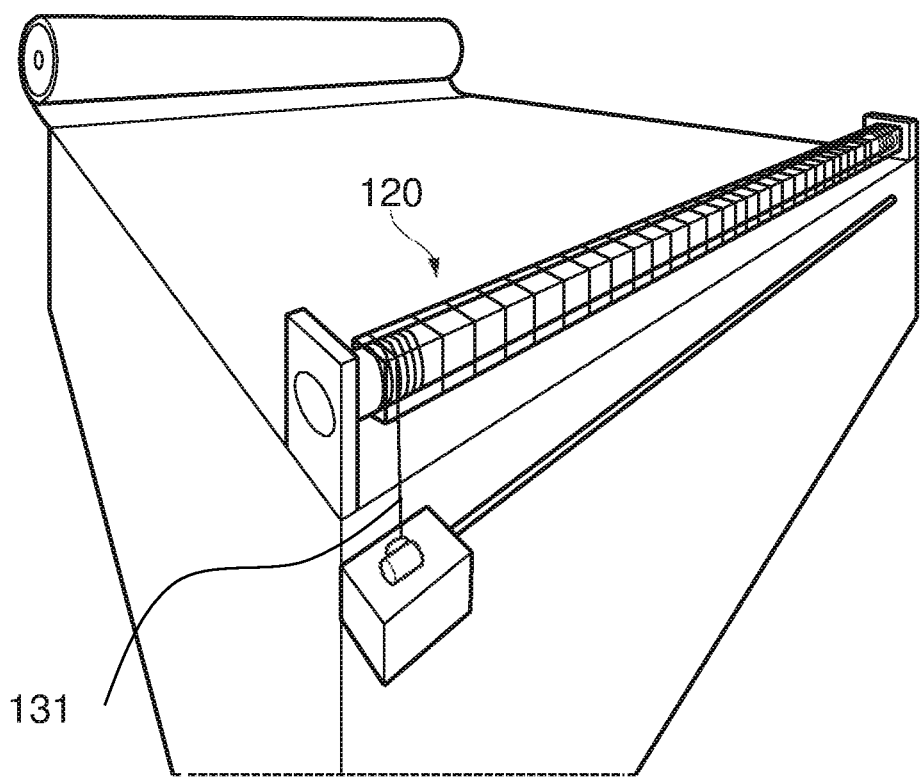
FIG. 12 shows filamentary material being wound a blank assembly, to secure its elements in place.

FIGS. 11*a*, 11*b* and 12 show a tool for forming the transition layer 102. The spindle 167 is rotatably mounted between a pair of bearings 130. First, as indicated in FIG. 11*b*, an innermost fibrous ply 81 is wound onto the spindle 167 by unwinding it from a spool 136 of fibrous sheet material 164 and rotating the spindle 167 by at least one complete turn. In embodiments, two or more complete turns may be preferred so that the innermost ply 81 is formed from multiple layers of the fibrous sheet material 164 forming a spiral. Initially the ply 81 has a cylindrical profile as shown in FIG. 11*b* and covers the grooves 68 and the core 62. After wrapping a length of the fibrous sheet material 164 around the spindle 167, the sheet material 164 may be cut, leaving the spindle 167 completely wrapped by at least one turn of the fibrous sheet material 164. Next, as shown in FIG. 11*a*, the spindle 167 is rotated while a line of filamentary material 131 such as filamentary tow is fed from a spool 132. A typical filamentary material used for this purpose may be e.g. carbon fibre or glassfibre or high-tensile polymeric material. Examples include 12K carbon fibre tow. "12K" denotes the fact that the filamentary material 131 is a bundle of 12,000 filaments, although other gauges of tow may be used such as e.g. anywhere between 2K and 40K. Initially the spool 132 may be positioned in line with a first groove 68 at or near an end of the bushing 40. For example, the spool 132 may initially be positioned at or nearby an end region 61 of the bushing 40. Thereafter, the spindle 167 is rotated so that the filamentary material 131 is wound into a first groove forming a winding 80 around the innermost ply 81 and binding that portion of the ply 11 into a groove 68 of the bushing. The number of turns of the spindle 167 at this stage determines the number of windings 80 of filamentary material 131 in the groove 68. For example, one or two or three or four or more turns of the spindle 167 may be made, generating correspondingly one or two or three or four or more windings 80 in the groove 68. Preferably, the spool 132 may be moved along a track 134 until the filamentary material 131 is in line with a next groove 68. The spindle 167 continues to be rotated as the spool 132 of filamentary material 131 moves incrementally between the adjacent grooves 68, so that an angled connecting section 70 of the filamentary material 131 rides over the ridges 69 between the grooves 68 as shown in FIG. 7 and connects together windings 80 in adjacent grooves 68. The process then continues groove-by-groove 68 until a first set of windings 80 is in place. In FIG. 8, the first set of windings is shown with the number 85 and has two windings per groove. The filamentary material 131 is then tied off at each end, for instance by wrapping it over itself.

The illustration at FIG. 8 shows how a first set of windings 85 draws an associated first ply 81 into the grooves 68 of the bushing 40 so that it deforms from a cylindrical profile to adopt the wrinkled or corrugated profile shown in FIG. 8, including circumferential annular corrugations which are anchored into the grooves 68 by the first set of windings 85 as shown in FIG. 8.

Next, a second fibrous ply 98, shown in FIG. 8 with numeral 82, is wrapped around the spindle 167 and a second associated set of windings 80, shown in FIG. 8 with numeral 86, is wrapped around it, binding or anchoring it into the grooves 68—this time with e.g. four windings 80 per groove 68 rather than the two as illustrated in FIG. 8 over the innermost ply 81. The second set of windings 86 draws the associated second ply 82 into the grooves 68 so that the ply 82 adopts the undulating or corrugated profile shown in FIG. 8, including circumferential annular corrugations which are anchored into the grooves 68 by the windings 86. The process may be repeated to complete the transition layer 102, for example by adding further plies 98 (shown in FIG. 8 with numerals 83 and 84) bound in place by additional associated sets of windings 80 (shown in FIG. 8 with numerals 87 and 88).

The sets of windings 80 (shown in FIG. 8 as four sets of windings 85-88) run along the grooves 68 and alternate with the fibrous plies 98 (shown in FIG. 8 as four fibrous plies 81-84) which overlie the grooves 68. The innermost plies 98 may have significantly undulating profiles including circumferential annular corrugations which are anchored into the grooves 68 by their associated windings 80. This anchoring provides a strong interface which resists the bushing 40 being pulled out axially from the finished insert body 108, and is fatigue resistant. The fibrous sheet material 164 making up the plies 98 may be wrapped around the bushing 40 in such a way as to apply a fibre direction running across the grooves at an oblique angle to the grooves 68 such as 45°. Additionally or alternatively, the fibrous sheet material 164 may be wrapped around the bushing 40 such as to apply a combination of fibre directions running across the grooves 68. In this way, for example, one ply 98 may exhibit a fibre direction at 45° while another ply 98 may exhibit a fibre direction at 90° or 60° or 75° etc. As a result of the tightly wound filamentary material 131 making up windings 80 around the fibrous sheets 164, the plies 98 running across the grooves 68 thereby adopt a corrugated shape, or corrugations, as they are anchored into the grooves 68 by the windings 80.

The corrugations progressively reduce in amplitude from ply-to-ply in a direction away from the bushing 40 surface so that the corrugations in e.g. a relatively outer ply 98 may be relatively shallow and, unlike the first, second and third plies 98 (shown in FIG. 8 as innermost plies 81-83), the corrugations of a relatively outer ply such as a fourth ply 98 (shown in FIG. 8 with numeral 84) or subsequent ply 98 may hardly extend into the grooves 68. In embodiments, the number of windings 80 overlying a ply 98 may progressively increase from one ply to a subsequent ply in a radial direction away from the bushing 40 surface. In optional embodiments, the outermost fibrous ply 98 of the transition layer 102 (shown as ply 89 in FIG. 8) may be wrapped around an outermost corrugated ply 80 (shown as ply 84 in FIG. 8) in such a way as to maintain a cylindrical, un-corrugated profile because no windings 80 are applied around it. Optionally this cylindrical outermost ply 90 may extend to cover the end region 61 of the bushing 40, unlike the corrugated plies 81-84.

The windings 80 may be formed by rotating the spindle 167, each rotation of the spindle 167 forming a single winding 80. The number of windings 80 per groove 68 for each set of windings may increase in a radial direction away from the bushing 40 surface. So the sets of windings 80, illustrated in FIG. 8 with numerals 85-88, may have two, four, six and eight turns per groove 68 respectively. Accordingly, the number of filaments per groove 68 may thereby correspondingly increase in a radial direction away from the bushing 40 surface. By way of example, with two windings 80 of a 12K filamentary tow over a given ply 98 in a single groove 68, there may be a 24,000 individual filament count (e.g. the innermost, first set of windings 85 shown over innermost ply 81 in FIG. 8). This may increase to e.g. 96,000 filaments per groove 68 over a subsequent or outermost ply 98 (e.g. the fourth set of windings 88 over the fourth ply 84 shown in FIG. 8).

As mentioned above, the circumferential grooves 68 and ridges 69 are preferably annular. The term "annular" is used herein to denote a closed or endless non-helical shape, which may or may not be circular. So there may be multiple unconnected annular grooves 68, rather than connected grooves which would collectively form a single helical external thread which runs along the full length of the body region 59 of the bushing. The annular groove shape enables multiple windings to be wrapped into each groove with a single pass of the spool 132. In an alternative embodiment, a helical external thread may be used (not illustrated), but in this case multiple passes of the spool 132 along an entire grooved body region 59 must be used if it is required to wrap multiple windings 80 into the external thread.

Figure 6B:
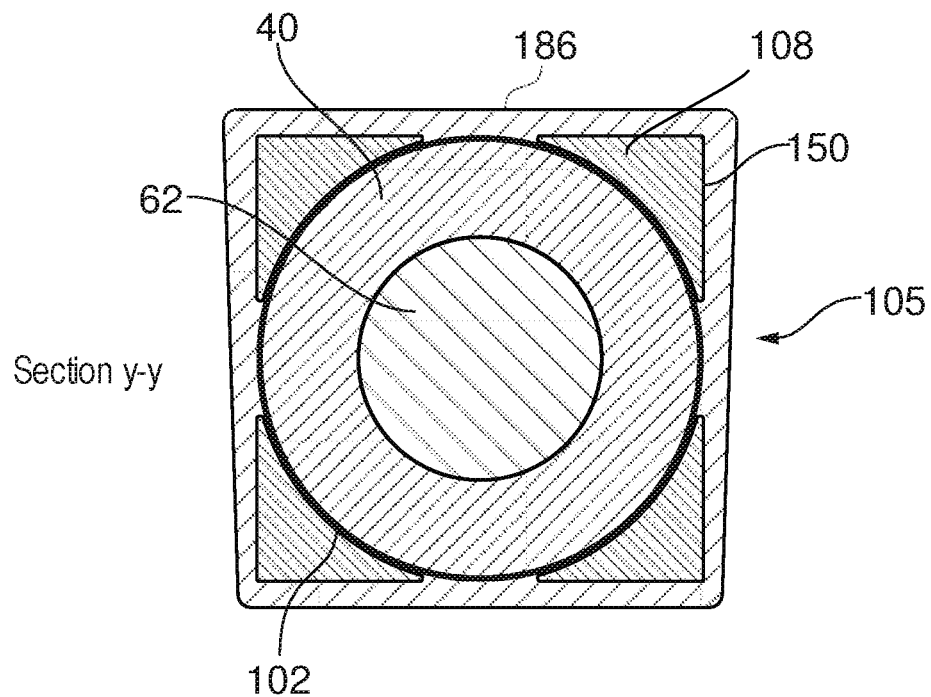
FIG. 6b is a cross-sectional view through the assembly of FIG. 6, sectioned along a line y-y and additionally showing lay-up elements around the transition layer.
Figure 6C:
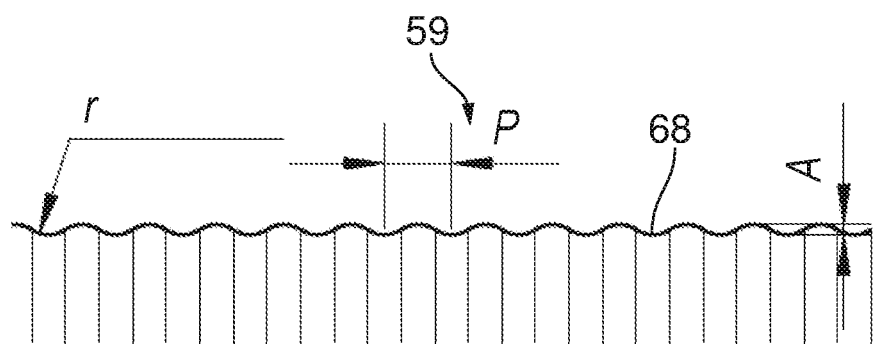
FIG. 6c shows a sectional profile across the grooves of a bushing, with a series of shallow and sinuous crests and troughs.

The outer surface of the bushing 40 has a sectional profile across the grooves 68 and ridges 69 with a series of crests and troughs as shown in FIGS. 6a, 6c and 8. The crests and troughs may be triangular as in FIG. 6a, or with flat crests as in FIG. 8, but in FIG. 6c a more preferred sinuous sectional profile is shown. In this case the sectional profile has rounded convex crests (corresponding with the ridges 69). The rounded crests may for example have a radius of curvature of about 4-8 mm, optionally 4-6 mm, optionally 4 or 5 mm, optionally about 4.54 mm. The sectional profile also has rounded concave troughs (corresponding with the grooves 68) with a radius of curvature of about 4-8 mm, optionally 4-6 mm, optionally 4 or 5 mm, optionally about 4.54 mm. The illustrated grooves 68 have a depth A and are separated by a pitch P. In the case of FIG. 6c the pitch P is 10 mm, and the depth A is 1.5 mm. So the grooves are relatively shallow and the ratio A/P is low—in this case about 1/6.7. This low ratio makes the walls of the grooves less steep which make it easy to anchor the fibrous plies into the grooves—particularly the innermost ply 81 which must closely follow the sinuous profile of the bushing as shown in FIG. 8. Other values of the pitch P and depth A may be used.

Figure 10:
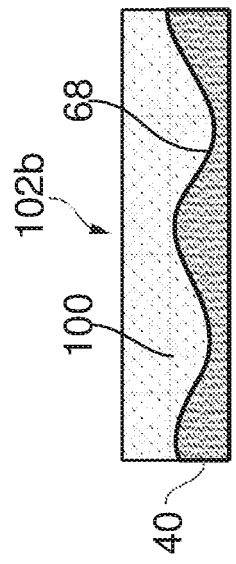
FIG. 10 is a sectional side view showing two grooves and a further alternative transition layer covering the grooves.
Figure 9:
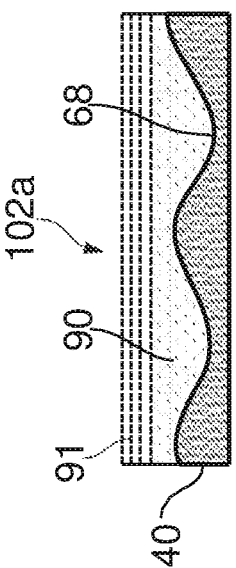
FIG. 9 is a sectional side view showing two grooves and an alternative transition layer covering the grooves.

FIG. 9 shows an alternative transition layer 102a, formed using windings alone. In embodiments, an initial set of windings 90 of filamentary material 131 which may run at a first angle to the length direction of the bushing 40. By way of example, the initial set of windings may be wound at a first angle of 90° to the length direction of the bushing 40. Further windings 91 of filamentary material 131 may be wound around the bushing 40 at a different angle, e.g. 15°, 30°, 45°, 60° or 75°. In embodiments, the filamentary material windings 90, 91 may comprise glassfibre or carbon fibre tow. FIG. 10 shows a further alternative transition layer 102b also formed using windings alone. In the case illustrated in FIG. 10 a single set of windings 100 is arranged over the grooves 68, at a given winding angle to the bushing 40, with no additional overlying windings 91. By way of example the filamentary material 131 of the illustrated windings 100 may be glass or carbon fibre. These may run at 90° to the length direction of the bushing 40.

In the method described above, the sheet material 164 forming each ply 98 of the transition layer 102 may extend almost the full length of the spindle, up to an end region 61 of each bushing 40. In other embodiments (not shown) each ply 98 may be formed from multiple sheets laid up side by side, or it may be formed by winding a narrow strip or tape of fibrous material onto the spindle 167 thereby to cover the bushing 40 and all of or part of the core 62 in a spiral.

In the example described above, the windings 80 may optionally be formed from filamentary material 131 in the form of tow, such as carbon tow. In alternative embodiments, perhaps for cost reasons, the filamentary material 131 may be replaced by a twisted fibrous yarn (not shown) provided the requisite level of tension can be applied to it and maintained.

Figure 13:
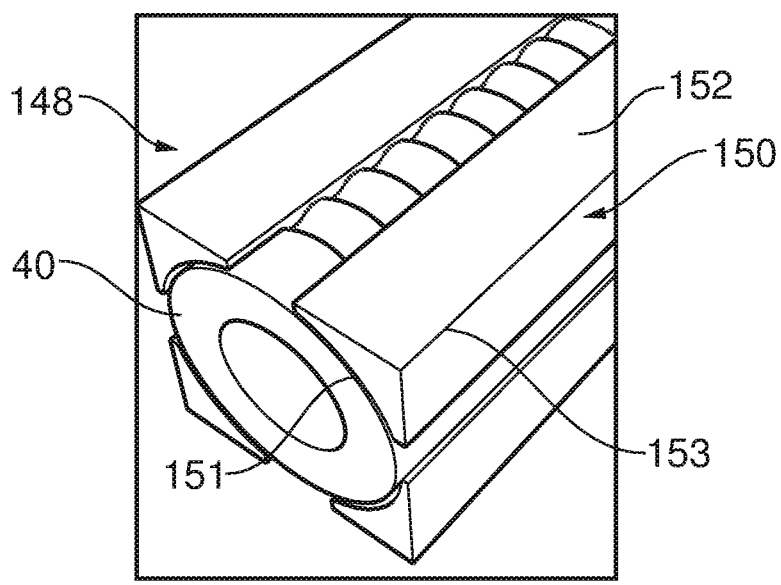
FIG. 13 is a figurative isometric view showing pultruded battens fitted around one of the bushings.
Figure 14:
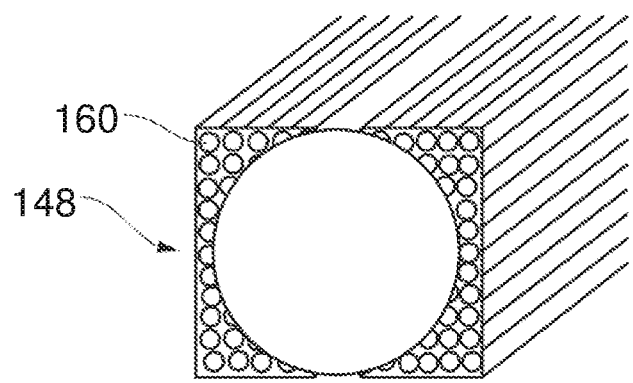
FIG. 14 shows an alternative arrangement in which the battens are formed from glass rods.
Figure 15:
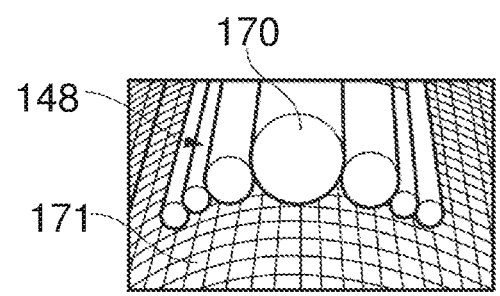
FIG. 15 shows an alternative batten formed from glass rods of varying cross section.

Once the transition layer 102 has been formed as described above, two or more fibrous battens 148 may be positioned around the transition layer 102 to form the insert body 108. These battens may preferably give the insert body 108 a square or trapezoidal cross-section. A batten 148 can have different forms. These battens may include for example: a pultruded preform 150 as shown in FIG. 13, or assemblies of pultruded glass fibre rods 160, 170 as shown in FIGS. 14 and 15 respectively. Note that in FIG. 13, a bushing 40 is illustrated, while the transition layer 102 is not shown. The pultruded glassfibre rods may in particular be provided in a single gauge, as shown for example in FIG. 14 or in a mix of gauges, as shown in FIG. 15. In all cases, the battens 148 allow to generate a desired cross-sectional shape of the insert body 108 prior to a wrapping and/or moulding step for further forming the insert 105. The longitudinally arranged battens 148 also give structural strength to the insert body 108. In embodiments the battens 148 may be porous and capable of being infused by resin. In one embodiment (not shown) the battens may be formed by placing lengths of rope alongside the bushing 40, preferably along and adjacent to the transition layer 102.

As shown in the example of FIG. 13, the preforms 150 may have a deltoid cross-section with a concave cylindrical inner face 151. The deltoids may approximately conform to the convex cylindrical outer contour of a transition layer 102 (see e.g. FIG. 6b), and a pair of outer faces 152 which meet at a convex or outer corner or edge 153. In embodiments, a preform 150 may be made from pultruded, fibrous material in a resin matrix. Alternatively, in embodiments, a preform 150 may comprise a "dry" pultruded fibre material containing binder material but no resin, so it remains porous. The "dry" fibre material may be pultruded by coating fibres in the binder material, or by adding powdered binder material to the fibre material, and then pulling them through a heated die having the required deltoid cross-section. The binder material holds the fibres together so the preform 150 retains the deltoid cross-section. In the context of the deltoids, or preforms, the term "fibre" is intended to designate filamentary material such as continuous filamentary material such as glassfibre or carbon fibre or other extruded filamentary material such as filamentary polymeric material.

In FIG. 13 or FIG. 6b, the insert is shown having four fibrous battens 148 in the form of pultruded preforms 150. Each preform 150 preferably has a deltoid cross-section with a concave inner face 151 which lies adjacent, and may preferably contact, the transition layer 102. Note that for purposes of illustration, the transition layer 102 is not shown in FIG. 13, to enable the grooved outer surface of the bushing to be seen. Note also that in this example, the grooves in the outer surface are shown almost up to the root end of the bushing, unlike in FIG. 6a in which the end region 61 of the bushing has no grooves.

The pair of outer faces 152 meet at an external corner 153 of the deltoid preform 150. Each preform 150 may have an identical cross-section. In this way, the deltoid preforms 150 give the insert body 108 a square cross-section. In the alternative example of FIG. 14, the insert body 108 may have only two battens 148, each shaped in the form of a half hourglass shape, having two deltoid lobes.

A plurality of pultruded rods 160 or 170 may be aggregated or assembled together into an approximate deltoid shape. In an embodiment, as shown in FIG. 14, pultruded rods 160 which may be of a same gauge may be aggregated to form longitudinally extending deltoid shapes. These aggregated rods 160 may then be laid alongside a wrapped bushing 40 to generate an insert body 108 having the desired cross-sectional shape and having the desired structural properties.

In further embodiments (not shown) lengths of rope may be used to form the battens 148 instead of pultruded preforms 150 or rods 160, 170. Such rope may be porous. Lengths of rope may be positioned approximately as illustrated in the embodiment of FIG. 14, although it may be preferred to use a single larger gauge rope which, being compliant, may be formed into a deltoid shape, occupying the corresponding space along a wrapped bushing 40.

The use of four separate fibrous battens 148 (as in FIG. 13) may be preferred over two battens 148 as in FIG. 14, since they can be moved about independently to better conform around a bushing 40 and provide a "wedging" effect which can improve consolidation in the final moulded product.

FIG. 15 illustrates a further alternative deltoid fibrous batten 148, in this case formed by an assembly of porous glass fibre rods 170 having varying circular cross-sectional areas so they form the required deltoid cross-section. The rods 170 can be stabilised by being attached to a mesh 171 wrapped around the transition layer, or by placing them in a former and bonding them together at discrete locations. The cross-sections approximate to a deltoid shape, so the battens give the part a square cross-section. According to the embodiment illustrated in FIG. 15, a large gauge pultruded rod 170 may be positioned at a longitudinally extending corner position of an insert body 108. Smaller gauge pultruded rods 170 may be positioned in flank regions adjacent the corner rod 170. In some embodiments, flanking rods may also be of varying gauge. Flanking rods 170 may decrease in cross sectional size in a direction away from a larger gauge corner rod 170.

An advantage of using ropes or rods 160, 170 for the battens 148, compared with the use of pultruded preforms 150, is that the ropes or rods 160, 170, being stock products, are available at low cost and do not require a bespoke pultrusion die.

The battens 148 may extend along the full length of the bushing and core 62, covering not only the transition layer 102 but also the end region 61 of the bushing. Alternatively, the battens 148 may terminate at the end of the body region 59 where the body region 59 meets the end region 61. Accordingly, one-piece end caps (discussed below with reference to FIG. 31) may be fitted over the end regions 61, the end caps having the required square or trapezoidal outer profile of the insert body 108.

The cylindrical profile of the outermost ply 89 of the transition layer 102 ensures a smooth connection surface to interact with the deltoid battens 148 described above. After the battens 148 have been fitted, an outer shell layer 186 (shown in FIG. 6b) comprised of sheets of fibrous sheet material 164 may be wrapped around the assembly, thereby to bind together the assembly of the battens 148 and the wrapped bushing 40. The outer shell layer 186 may thereby form an outside region of the insert body 108. The fibrous sheets 164 of the outer layer 186 may comprise unidirectional fibres or bi-axial or tri-axial fibre layers. The fibrous sheet material of the outer shell layer 186 may optionally have a higher basis weight than one or more of the plies 98 of the transition layer 102 around the bushing 40. Alternatively, the fibrous sheet material of the outer shell layer 186 may optionally be of a same material or type as one or more of the plies 98 of the transition layer 102 around the bushing 40. Optionally, the fibrous sheet material 164 of the outer shell layer 186 may be applied by unwinding the material 164 from the spool 136 and rotating the spindle 167 by a required number of turns. In embodiments, a single turn may be applied although it may be preferred to apply two or three or more turns of the sheet material 164 to make up the outer shell layer 186. Finally, the outer shell layer 186 may be secured in place by winding filamentary material 131 around it, as shown in FIG. 12. The filamentary tow 131 around the outer shell layer 186 may be the same as or of a different type than the filamentary material 131 of the windings 80 over the plies 98 of the transition layer 102. Optionally, 12K carbon fibre tow may be wound around the deltoid battens 148 before the sheets of the outer shell layer 186 are applied, in order to hold the battens 148 to the bushing 40 and the core 62.

Once the winding process of fibrous sheet material 164 and filamentary material 131 around the bushings 40 and core 62 has been completed, the final assembly 120 shown in FIG. 12 may then be removed from the bearings 130.

As shown in FIG. 6a, the bushing 40 may have a plug 75 blocking its internal bore 109. Optionally, the plug 75 may be positioned between the frustoconical recess 65 and the bore 109. The plug 75 may prevent matrix material from flowing from the recess 66 into the bore 109 during the infusion process. Optionally, the plug 75 may be integral with the bushing. Alternatively, the plug may be added as a separate element in the bore 109.

Each pultruded preform 150 in the assembly 120 may comprises a "dry" fibre material containing binder material but no resin, so it is porous and becomes infused with epoxy resin in the infusion mould. In an alternative embodiment, each pultruded preform 150 in the assembly 120 may be supplied as a cured fibre-reinforced composite material—such as a fibrous material in a cured vinyl ester resin.

After it has been moulded in the mould cavity and cured, the intermediate product shown in FIGS. 17-20 can be removed from the infusion mould. The intermediate product of FIGS. 17-20 is referred to below as a blank 190. The walls 182, 183, 185 of the mould cavity may give the blank 190 a desired outer profile, an example of which is shown in FIGS. 17-20. It should be noted that in FIGS. 17-20 and throughout this specification, the draw angle, that is to say the angle of convergence of the side faces 343, 344 of the blank 190, at its respective end faces 312a, 312b is greatly exaggerated, for clarity. In practice, the deviation from a right-angle may be of the order of one degree or two degrees or of three degrees, between both side faces 343, 344.

The purpose of making inserts 105 by the method of placing two bushings 40 at either end of a longitudinal core material 62 to form a spindle 167, is to optimise and rationalise the forming process for the inserts 105. The process is optimised because it allows two inserts 105 to be made from a single blank 190, by dividing the double-ended blank 190 into two parts, to form two inserts. In other words, a single moulding or forming process of a blank 190 may be used to make two inserts 105. When using the RTM process to form the blanks 190, a problem arises in that it is difficult to obtain the optimal shape of the inserts 105 by this method. It is possible to obtain a rectangular prism by RTM moulding, although it can be difficult to extract a parallel-sided, moulded prism from its RTM mould without using a removable mould insert, in the form of a removable side wall portion which may be tapered to allow its removal from the mould together with the moulded blank. The moulded blank may then be released from the removable mould insert outside the mould. The same technique may be used when moulding parts with undercuts. But using a removable wall portion of a mould creates difficulties when working with resin infusion techniques, because the resin tends to glue the supposedly removable mould elements together, or to clog up the separable mould elements. In any case, even if a parallel-sided rectangular prism shape were moulded to form a double-ended blank 190, the inserts 105 generated from such a blank would need to be machined to a slightly trapezoid shape in order to enable the creation of a circular arrangement of inserts 105 around a blade root, when these inserts 105 are butted-up side by side as in FIG. 4. It is possible to mould a prism shape in the form of a trapezoid, whose sloping sides would allow removal from an RTM mould. But if a trapezoid prism is to be divided into two identical inserts 105, the division can only be by way of a bisection of the lengthwise extent of the blank 190. In the case of root inserts 105, this generates a suboptimal shape for the manufacturing process and for the laid up inserts 105 in a blade root 20. In particular, it is desirable to provide inserts which exhibit a tapering portion, tapering down in a direction away from the root face of a wind turbine blade. This tapered shape of an insert 105 allows a more gradual load transfer between an insert 105 and the composite material of the wind turbine blade shell 27. The creation of a tapered insert from a double-ended blank 190 preferably requires a diagonal cut to be made through the blank 190, dividing the blank 109 into two identical inserts 105. When a blank 190 has the shape of a rectangular prism, such a diagonal cut generates two identical inserts 105. On the other hand, if the blank has the shape of a trapezoid, the two inserts 105 generated from a diagonal sectioning cut will be non-identical, as in a left and a right shoe, or such like. This means that when forming a circle from the tapered trapezoid inserts 105 arranged side-by-side, one set of inserts will leave the tapered faces oriented in a direction opposite to the orientation of the tapered faces of the other set of inserts. In other words, one set of inserts would be unusable. In either case, whether moulding rectangular or trapezoidal blanks 190, an additional machining step would be required to be performed on the sectioned inserts 105 in order to generate inserts 105 which can be fitted together to create a circle of inserts 105 having a consistent geometry. In order to overcome this problem, it is suggested to generate the blank 190 in the form of a double trapezoid shape. This double-trapezoid shaped blank 190 allows the creation of two identical, tapered inserts 105 each having a slightly trapezoid cross section, merely by diagonally sectioning the blank 190. Such inserts 105 may be laid-up at a root portion 20 of a wind turbine blade 18 without further machining, and preferably without requiring the insertion of wedge-shaped shims between adjacent inserts 105. A double-trapezoid blank 190 has an advantageous shape, allowing it to be bisected into two identical or near-identical inserts 105.

Aspects of the present invention may include a process for making such a blank 190, which process is adapted in certain ways, as well as aspects of the blank itself.

Figure 32:
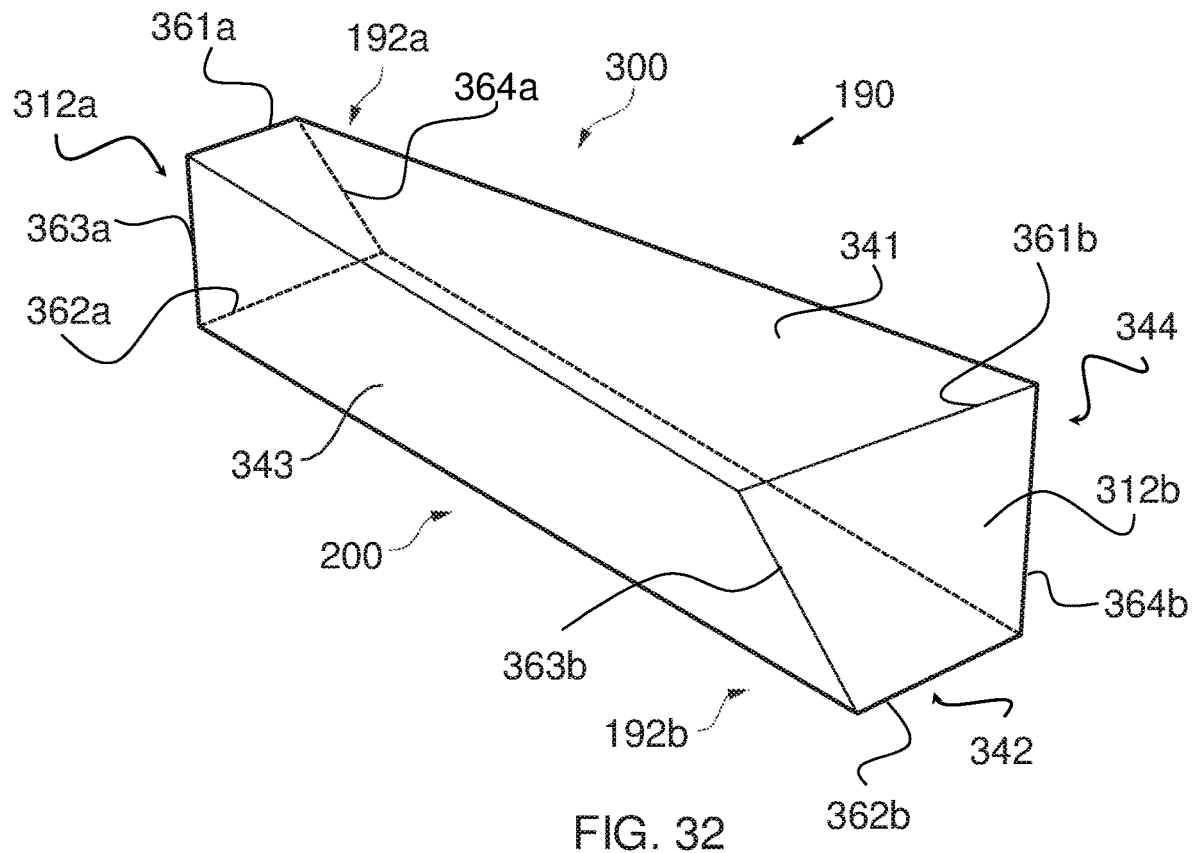
FIG. 32 shows a blank.

FIG. 32 shows a composite, elongate blank 190 having an elongate blank body 300. The blank body 300 extends longitudinally about a longitudinal axis (not drawn) between trapezoid end faces 312a, 312b. The illustrated end faces include a first end face 312a and a second end face 312b. Each end face 312a, 312b is bounded by edges which define its trapezoid shape. A first end face 312a comprises two opposing parallel edges: a fist, minor end edge 361a and a second, major end edge 362a. The first end face 312a comprises two non-parallel opposing side edges or equal or near-equivalent length: a side, third edge 363a and a side, fourth edge 364a. A second end face 312b comprises two opposing parallel edges: a major, first end edge 361b and a minor, second end edge 362b. The second end face 312b comprises two non-parallel opposing side edges: a side, third edge 363b and a side, fourth edge 364b. The blank body 300 has four principal, longitudinal, peripheral faces, including a first peripheral face 341, a second peripheral face 342, a third peripheral face 343 and a fourth peripheral face 344. Each said peripheral face 341-344 extends in a longitudinal direction of the blank 190. Each said longitudinal face 341-344 connects corresponding pairs of side edges 361a and b; 362a and b; 363a and b; 364a and b. Said first peripheral face 361, joins a minor, first end edge 361a with a major second end edge 361b; said second peripheral face 362, joins a major, first end edge 362a with a minor, second end edge 362b; said third peripheral face 363, joins a side, third edge 363a of a first end face 312a with a side, third edge 363b of a second end face 312b; said fourth peripheral face 364, joins a side, fourth edge 364a of a first end face 312a with a side, fourth edge 364b of a second end face 312b. In the embodiment illustrated in FIG. 32, the blank body 300 defines a transition portion of the blank 190, along which the cross section of the blank 190 transitions from a trapezoid shape at a first end 312a of the transition region to an inverted trapezoid shape at a second end 312b of the transition portion 200. In the embodiment of FIG. 32, the transition portion 200 extends between the end faces 312a, 312b of the blank 190. In other embodiments, a transition portion 200 may begin and end longitudinally inboard of said end faces 312a, 312b, between end portions 192a, 192b of the blank body 300. The first and second peripheral faces 341, 342 of the blank 190 may be planar; preferably planar and parallel; preferably also flat. The side, third face 343 and the side, fourth face 344 may be predominantly, although not strictly planar. The side, third face 343 and the side, fourth face 344 may be predominantly planar and slightly curved or arcuate. Parts of the side faces 343, 344 may be planar. In particular, the side faces 343, 344 may comprise more than one planar facet. The transition portion 200 may have a variable cross section along its length. The transition portion may have a generally quadrilateral cross section along its length. A cross-section of the transition portion 200 may include straight, parallel upper and lower edges and non-parallel lateral edges. The lateral edges of a cross-section across the transition portion 200 may be partly concave or slightly concave. Each end portion 192a and 192b may comprise a respective embedded bushing (not shown). The trapezoid cross section of the first end portion 192a is inverted relative to the quadrilateral cross section of the second end portion 192b. The upper and lower faces 341, 342, of the blank body 200 may be parallel and planar trapeziums, which taper in opposite directions. The side faces 343, 344 may be non-planar, continuously curved surfaces which twist along the length of the blank. The blank 190 shown in FIG. 32 may be bisected into equal parts, in particular to form two equally dimensioned inserts 105. A bisection plane may pass transversely through the blank 190. The bisection plane may intersect diagonally with the side faces 343, 344. The bisection plane may intersect at a straight, transverse line with the upper and lower faces 341, 342. Each insert may extend from a root face end 232 to an embedment end 236.

In an alternative embodiment, the, and referring to FIGS. 17-23, the blank 190 preferably has the approximate shape of a prism. The blank 190 in addition to its transition portion 200 may also comprise a pair of end portions 192a and 192b being a first 192a and a second 192b respective end portion. Each end portion 192a and 192b may contain a respective bushing 40. Each end portion 192a or b preferably has four peripheral faces which meet at four edges or corners to preferably form a slightly trapezoidal cross-section. Thus, for example, the faces of the first end portion 192a may comprise a respective first end portion major face 194a; a first end portion minor face 196a; and a pair of first end portion side faces 198a. On the other hand, the faces of the second end portion 192b may comprise a second end portion major face 194b; a second end portion minor face 196b; and a pair of second end portion side faces 198b. Note that the degree of convergence of the angle subtended by the end portion side faces 198a and 198b is exaggerated in FIGS. 17-23 to emphasise the trapezoidal shape of that part of the blank 190. Preferably all the peripheral faces of the end [portions 192a, 192b extend parallel to a longitudinal axis through said blank 190. In embodiments, the opposing, non-parallel side faces 198a, 198b of the blank 190 near its respective ends, may diverge by an angle of less than five degrees, preferably less than four degrees, preferably three degrees or less.

At a respective first or second end of the blank 190, each said major face 194a or b of the blank 190 is wider than its associated minor face 196a or b. As shown most clearly by comparing FIG. 21 with FIG. 23, the trapezoidal cross section of the first end portion 192a of the blank 190 is inverted relative to the trapezoidal cross section of its second end portion 192b. So the major face 194a of the first end portion 192a (shown in FIG. 23) is at the blank's lower face 342, whereas the major face 194b of the second end portion 192b (shown in FIG. 21) is at its upper face 341. Similarly the said minor face 196a of the first end portion 192a is at the blank's upper face 341, whereas the said minor face 196b of the second end portion 192b is at its lower face 342.

In embodiments, a transition portion 200 may extend between the two end portions 192a,b of the blank 190. As mentioned above, each end portion 192a and 192b may contain a respective bushing 40 and the trapezoidal cross-section of each end portion 192a,b preferably does not vary along the longitudinal direction of the blank—in other words each end portion has a parallel-sided prismatic shape. The transition portion 200, on the other hand, has a cross-sectional shape which preferably varies continuously along the longitudinal direction of the blank. Therefore in the embodiment of FIGS. 17-23 the transition region 200 defines that part of the blank 190 along which there is a shape transition between the mutually inverted trapezoidal cross-sectional shapes of the first portion 192a and the second portion 192b.

Figure 17:
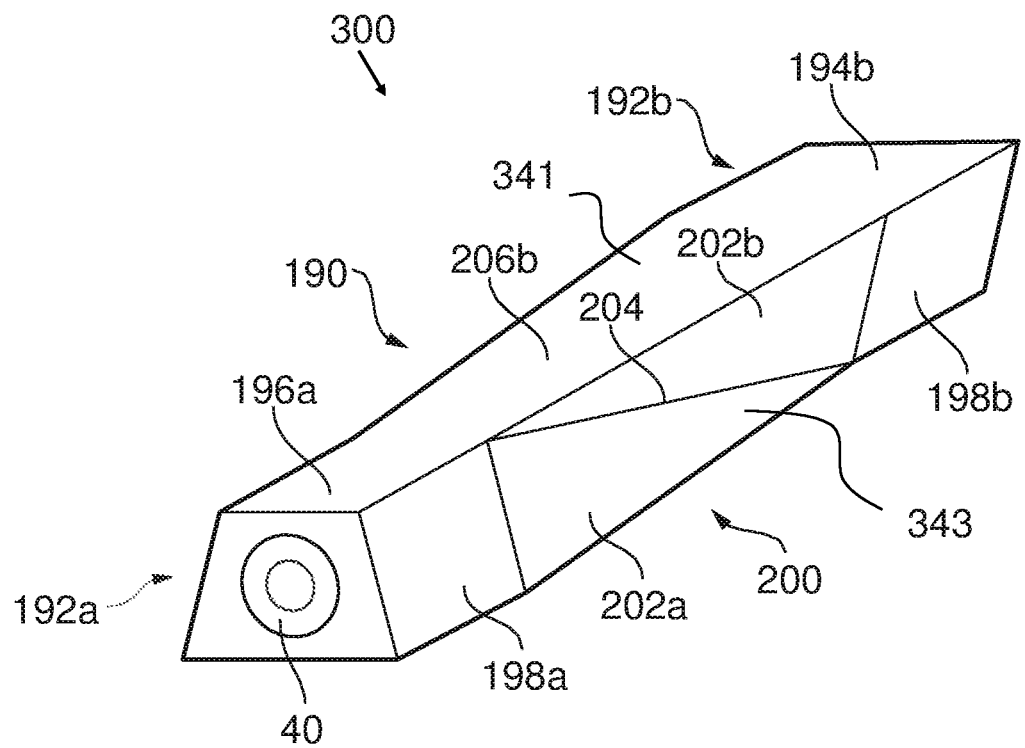
FIG. 17 is an isometric view of a blank.
Figure 18:
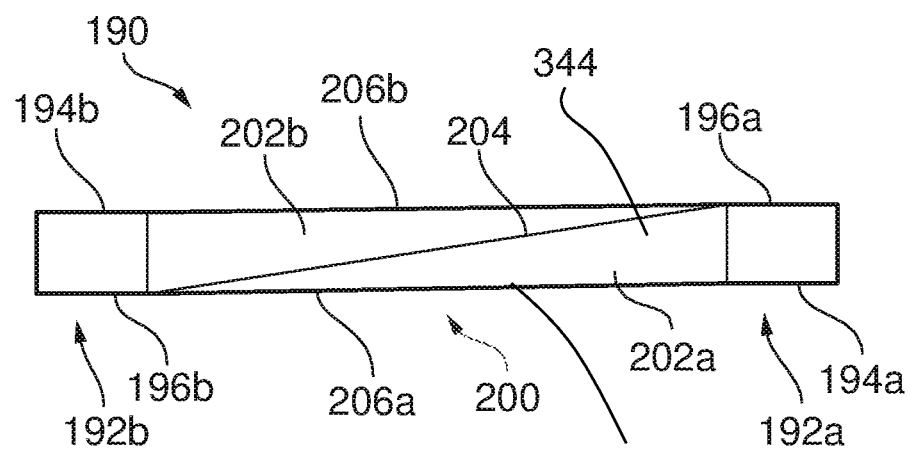
FIG. 18 is a side view of the blank of FIG. 17.

The transition portion 200 may comprise a pair of opposing side faces 343, 344, each one of which meets a respective end portion side face 198a and 198b at each of the end portions 192a and 192b. One of the side faces 343 of the transition portion 200 is shown in FIG. 17, and the corresponding opposite side face 344 is shown in FIG. 18. Each side face 343, 344 of the transition portion 200 of the blank 190 may be smooth, continuous. Alternatively, each said side face may comprise multiple planar facets. For example a side face 343, 344 of a transition region 200 may have two planar triangular facets 202a,b. According to this embodiment, top facets 202b may meet bottom facets 202a at a diagonal edge or corner 204. The blank 190 of FIG. 17 may be cut into a matching pair of inserts by cutting along a diagonal edge 204 across a side face 343, 344.

Figure 19:
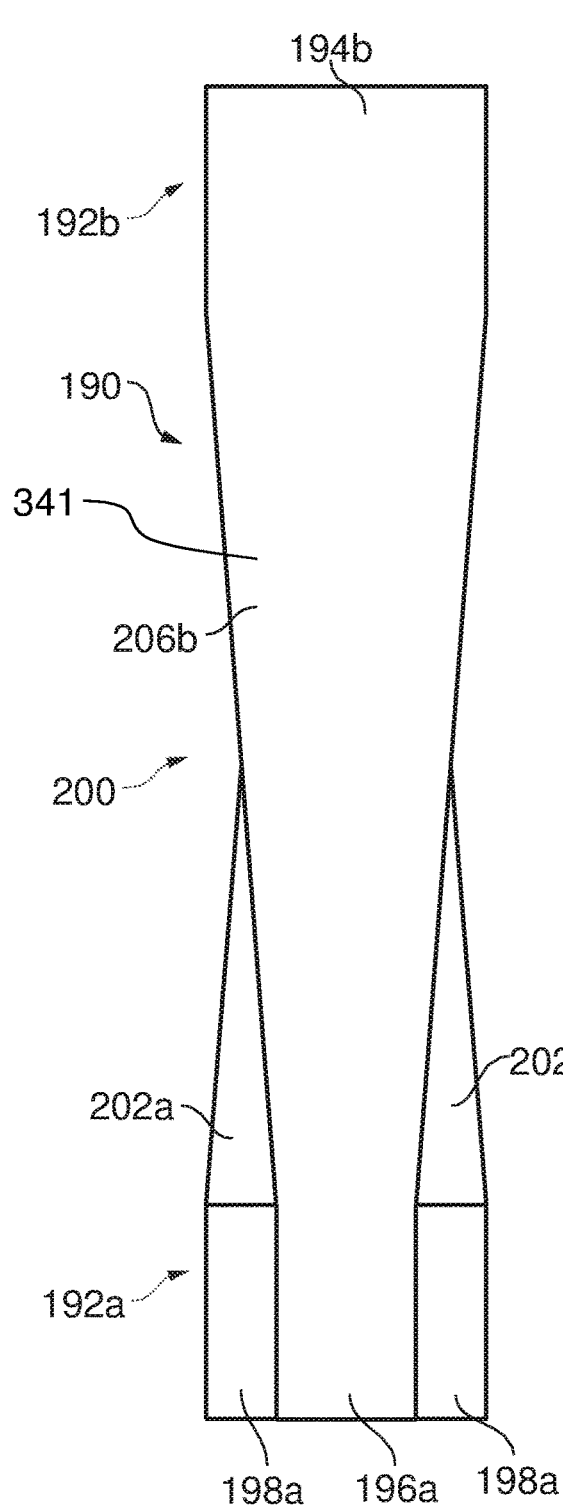
FIG. 19 is a plan view of the blank of FIG. 17.
Figure 20:
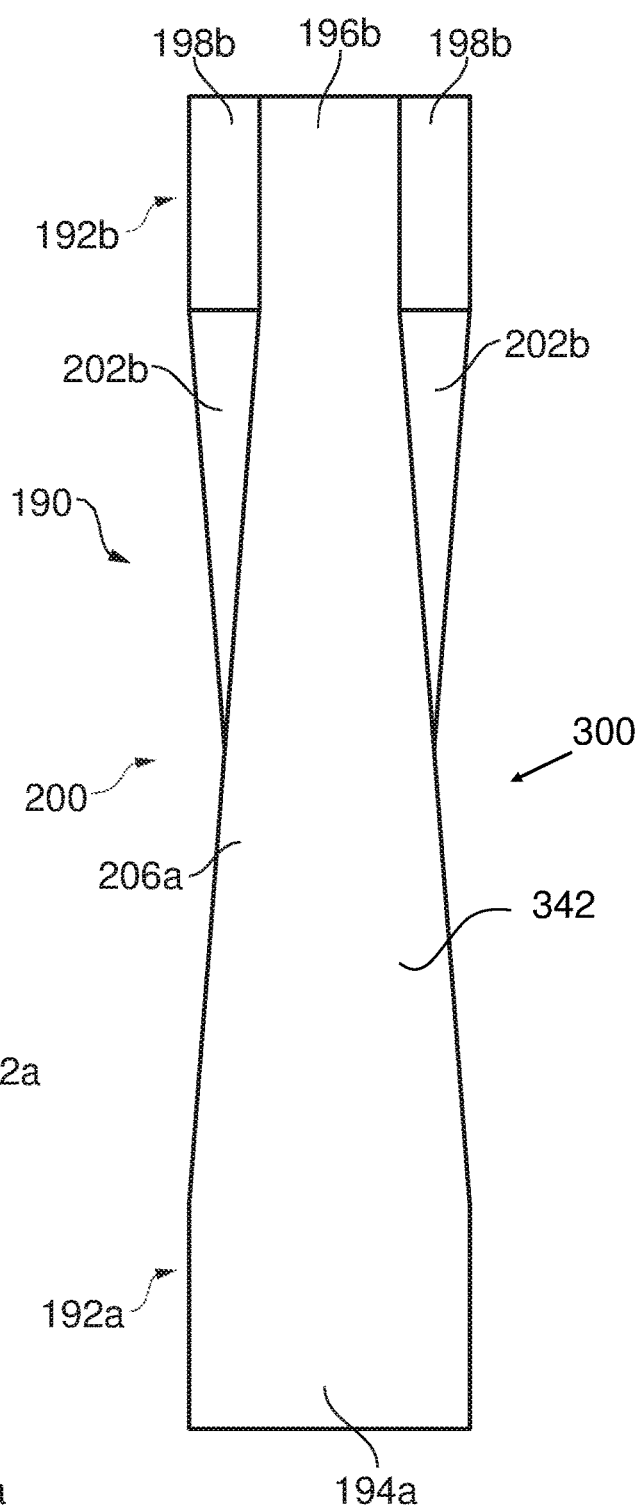
FIG. 20 is a bottom view of the blank of FIG. 17.

The transition portion 200 has a preferably planar upper face 206b shown from above in FIG. 19 which meets the second end portion major face 194b and the first end region minor face 196a of the end portions 192a, 192b; and a preferably planar lower face 206a shown from below in FIG. 20 which meets the second end portion minor face 196b and the first end portion major face 194a of the end portions 192a, 192b.

Figure 21:
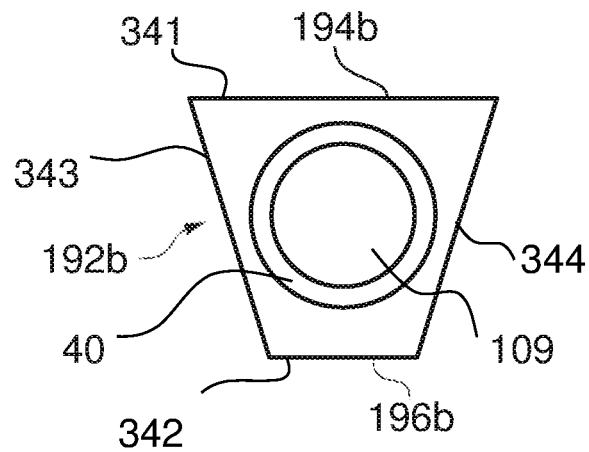
FIG. 21 is a cross-sectional view of the second end portion of the blank of FIG. 17.
Figure 22:
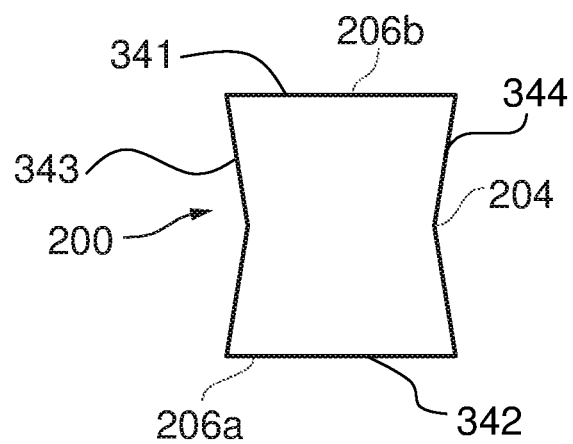
FIG. 22 is a cross-sectional view half way along the blank of FIG. 17.
Figure 23:
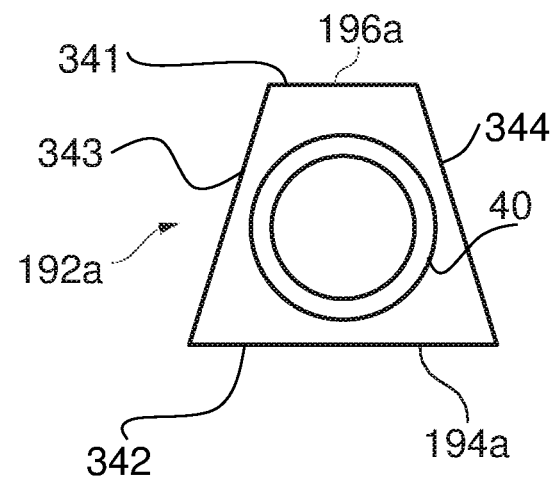
FIG. 23 is a cross-sectional view of the first end portion of the blank of FIG. 17.

FIGS. 21-23 show how the cross-section of the blank 190 may change along its length. At the mid-point, the cross-section has a waisted profile shown in FIG. 22 with the diagonal edge or corner 204 at a mid-point between the upper surface 206b and a lower surface 206a.

Figure 24:
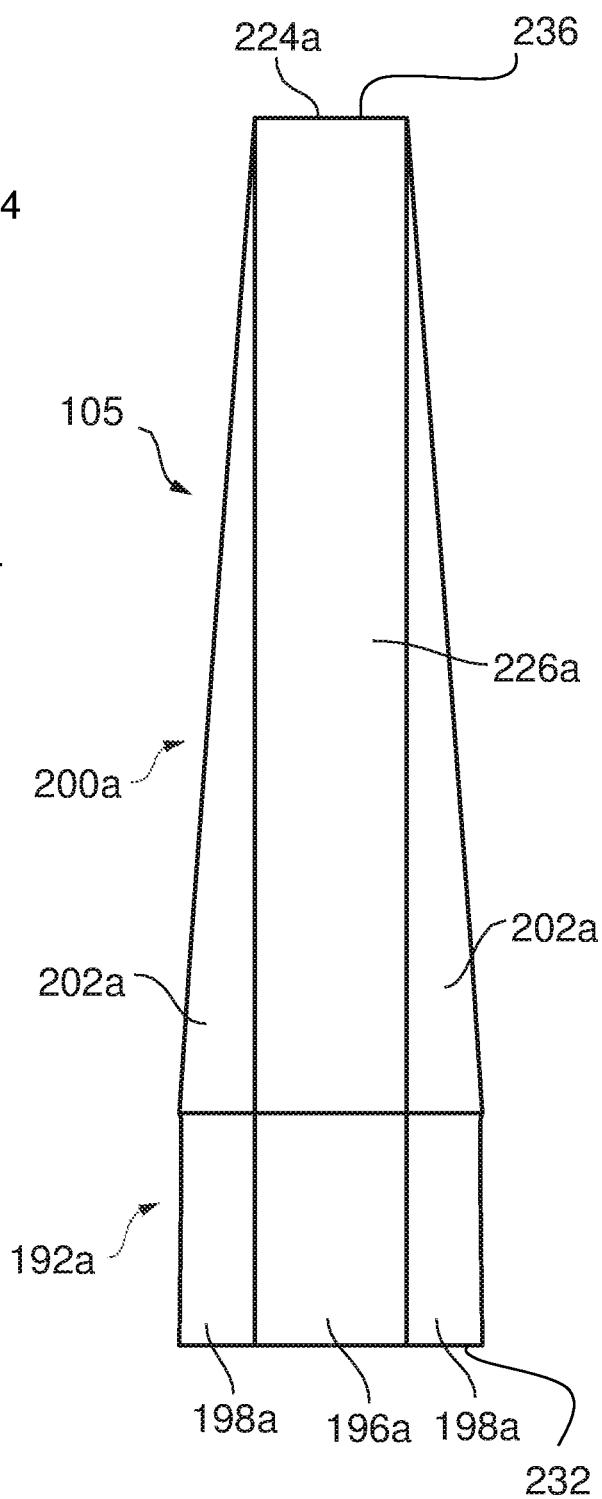
FIG. 24 is a plan view of an insert cut from the blank of FIG. 17.

An insert 105 shown in FIGS. 24-26 will now be described, using the same reference numbers as the blank 190 from which it may be cut. The illustrated insert 105 extends from a root face end 232 to an embedment end 236. It has a root end portion 192a with faces which form a trapezoidal cross-section, the faces comprising a major face 194a, a minor face 196a, and a pair of angled side faces 198a. The major face 194a is wider than the minor face 196a. When it is integrated into a wind turbine blade 20, the major face 194a is on the outside of the ring of inserts 105, and the minor face 196a is on the inside. The insert 105 also has an extension portion 200a, formed from the lower half of the transition portion 200 of the blank 190, which tapers inwardly in both height and width as it extends away from the end portion to a pointed tip 224a. The extension portion 200a has an outer face 206a (shown in FIG. 25) which meets the major face 194a of the end portion; a cut inner face 226a (FIGS. 24 and 26) which meets the minor face 196a of the end portion at an edge; and a pair of triangular side faces 202a. The triangular side faces 202a may be formed from the lower facets of the side faces 343, 344 of the blank 190. Although the insert 105 illustrated in FIG. 24 is shown with an end region 192a which has all peripheral sides parallel to its longitudinal axis, which may also be parallel to a longitudinal axis of a bushing 40 embedded in it.

Figure 25:
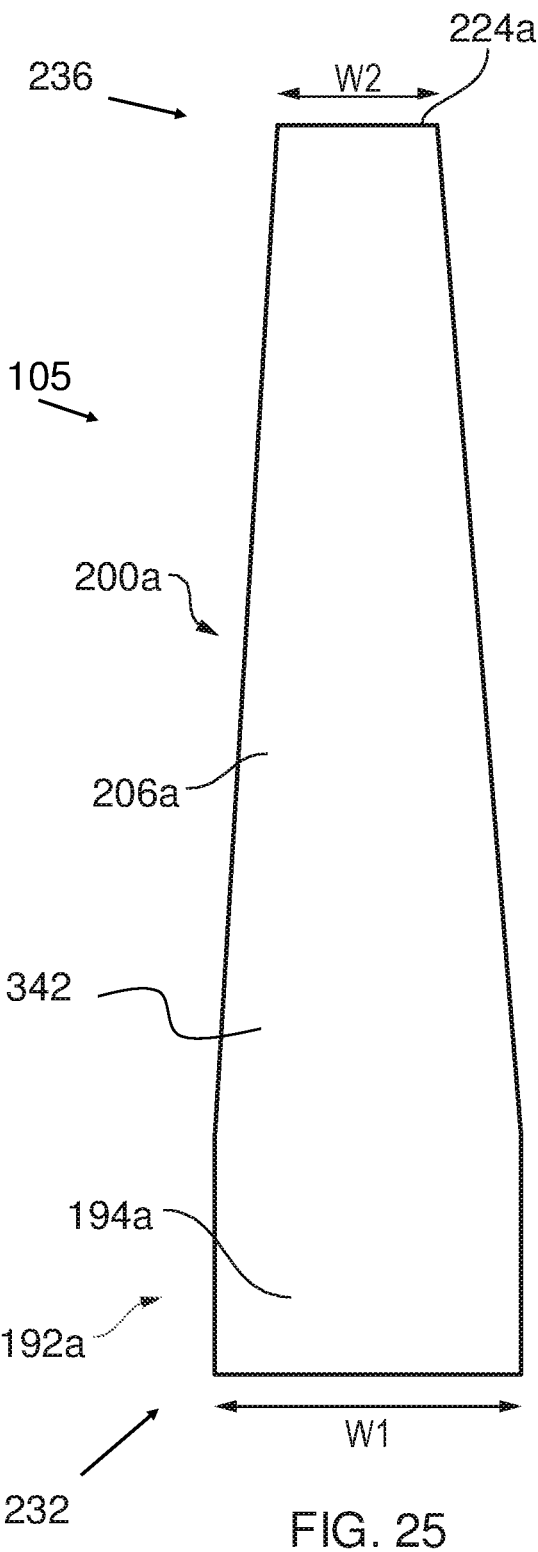
FIG. 25 is a bottom view of the insert of FIG. 24.
Figure 26:
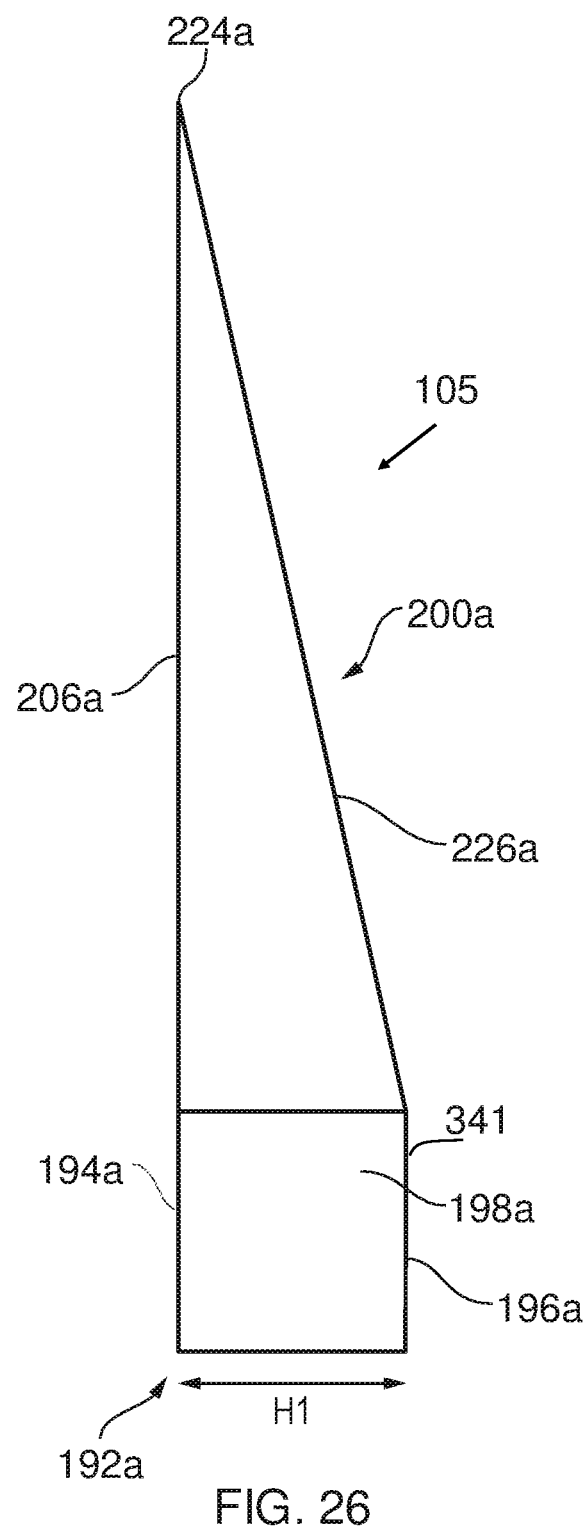
FIG. 26 is a side view of the insert of FIG. 24.

As shown in FIG. 25, the insert 105 may exhibit a maximum width dimension W1 at its root face end 232, larger than a maximum width dimension W2 at its embedment end 236. The insert may reduce uniformly in width from W1 to W2 as it extends away from the root end face 323, towards the embedment end 236, at its tip 224. Alternatively, the outer face 206a of an extension portion 200a may have a width which reduces uniformly from W1 to W2 as it extends away from the end portion 192a to the tip 224a.

The insert 105 has a height H1 between its upper and lower faces 341, 342. The height H1 at a root face end 232 may progressively reduce to zero at an embedment end 236. In alternative embodiments, as shown in FIG. 26, the height H1 at an end portion 192a, between outer and inner faces 206a, 226a may reduce uniformly from H1 to zero as it extends away from the end portion 192a to the tip 224a of the extension portion 192a.

As described above with reference to FIG. 4, an insert 220a may be integrated into a blade root 20 between glass fibre composite walls 41 and 42 with its outer faces 194a, 206a bonded to the outer composite wall 41 and its inner faces 196a, 226a bonded to the inner composite wall 42. The angle of taper between the outer and inner faces 206a, 226a of the extension portion of the insert may lie between 2 degrees and 20 degrees; preferably between about 2 degrees and 15 degrees; preferably between about 2 degrees and 10 degrees; preferably between about 3 degrees and 10 degrees; preferably between about 4 degrees and 8 degrees. In one embodiment, the angle of taper between the outer and inner faces 206a, 226a of the extension portion of the insert may be about arctan(0.1)—i.e. about 6° (note that this angle of taper is exaggerated in FIG. 26). This low angle of taper means that the plies of the inner composite wall 42 can be dropped off gradually. This may result in a low stress concentration when loads are transferred between an insert 220a and a blade 20. For example, about five or ten or more plies may be dropped off along the length of the angled inner face 226a.

Figure 16:
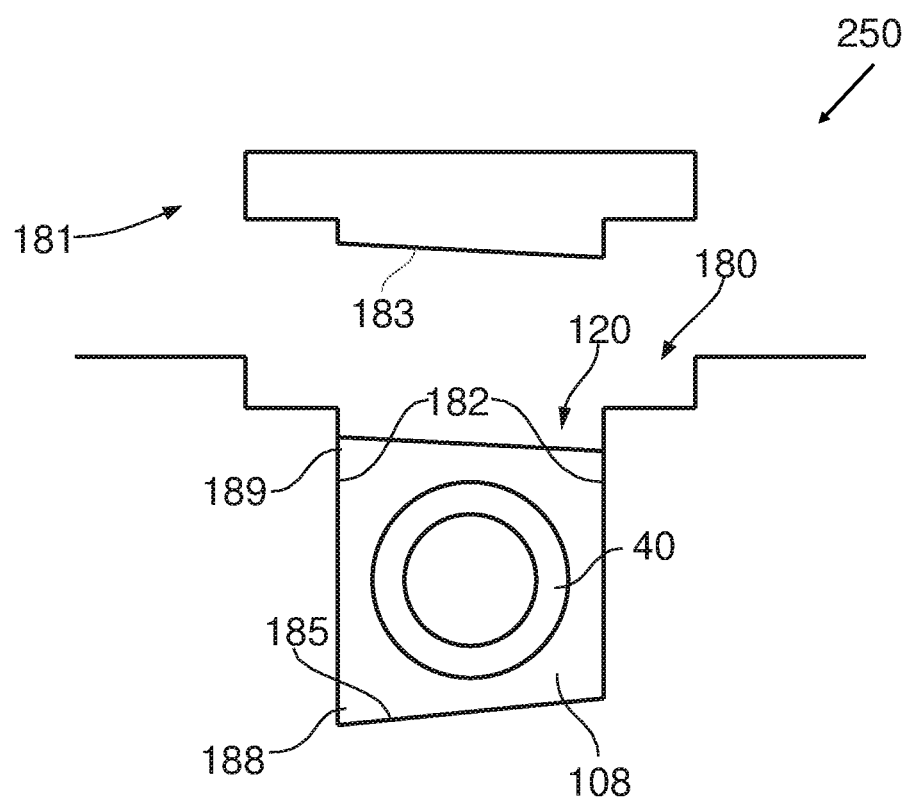
FIG. 16 shows an infusion moulding arrangement.

Preferably, the assembled elements for making a blank 190 may be placed in a resin transfer moulding (RTM) infusion mould, an example of which is shown in FIG. 16. The illustrated infusion mould 250 may comprise a base 180 with opposing side walls 182, a floor 185, and a lid 181, which together define a mould cavity. The lid 181 may have a moulding top surface 183 opposite the floor 185. FIG. 16 shows the two parts 180,181 of the mould 250 containing an insert assembly 120. After the lid 181 is fitted, a matrix material (such as epoxy resin) is injected into the infusion mould 250 so that the matrix material infuses though the porous fibrous material forming the transition layer 102, around or through the battens 148 and the outer shell layer 186. The assembly 120 thereby adopts the profile of the mould cavity. Still with reference FIG. 16: the floor 185 of the base 180 and the moulding surface 183 of the lid 181 may contact and mould the side faces 343 and 344 of the blank 190. The side walls 182 of the base may contact and mould its upper face 341 (or including 194a, 206a, 196b) and lower face 342 (or including 196a, 206b, 194b). Note that the angles of the upper and lower surfaces 183,185 may be exaggerated in FIG. 16 for purposes of illustration.

In the finished blank 190, the upper and lower faces 341, 342 may be parallel, in fulfilment of the trapezoidal cross-section of the end portions of a blank 190. However, for moulding the blank in a recessed mould having fixed, opposing side walls 182 and a fixed floor surface 185, per FIG. 16, the side walls 182 of the base 180 may need to be formed with a small draw rather than being parallel in order to allow removal of the moulded blank 190 from the mould base 180. Optionally the blank 190 may then be machined to remove the excess material caused by the small non-parallel, divergent draw, so that the upper and lower faces 343, 344 are made parallel for the cross-sections of the end portions 192a,b to become precisely trapezoidal.

The four battens 148 may preferably be similar or identical, so the outer profile of the assembly 120 may be square rather than trapezoidal as it is fitted into the infusion mould 180 as shown in FIG. 16. Optionally a twist or plait of glass fibre roving may be placed in the lower corner 188 of the mould base 180 at the wide part of the trapezoid section, preferably under any sheets of undirectional glass fibre which make up the shell 186. Similarly, a twist or plait of glass fibre roving may be placed in the upper corner 189 at the wide part of the trapezoid section. The glass roving may be placed under the one or more sheets of undirectional glass fibre sheet material which make up the shell 186. These twists/plaits give the assembly 120 a slightly trapezoidal shape prior to moulding, and encourage greater conformity into the mould corners.

Once the blank 190 has been cured and removed from the mould 250, it may be cut diagonally into two equally dimensioned parts. The provision of a blank 190 with a double-trapezoid shape as described herein, wherein one trapezoidal end 192a is inverted in relation to the other trapezoidal end 192b, ensures that the two inserts 105 which are formed as a result of bisecting the blank 190 are of equal dimensions and substantially identical. In embodiments, cutting may be carried out along the diagonal edges 204 to provide a matching pair of inserts 105. One of the inserts 105 of the matching pair is shown in FIGS. 24-26.

Figure 27:
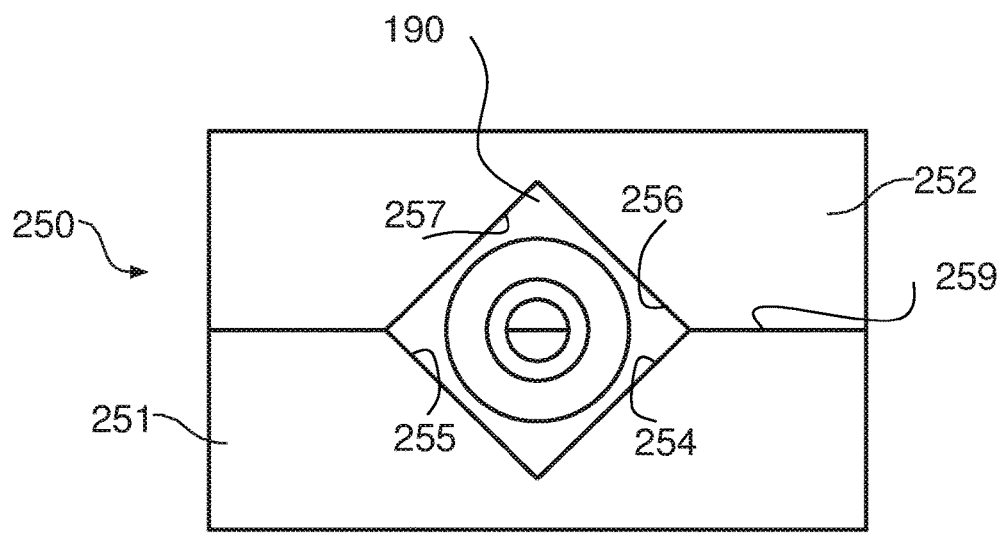
FIG. 27 shows a diagonally split, infusion mould arrangement.

An alternative infusion mould 250 for infusing and shaping the blank 190 from an assembly 120 is shown in FIG. 27. The mould 250 comprises first and second mould parts which meet at a split line 259: namely a base 251 and a lid 252. The base 251 has a pair of moulding faces 254, 255 and the lid 252 has a pair of moulding faces 256, 257.

Unlike the infusion mould of FIG. 16, each mould part 251, 252 contacts and moulds a respective side face 343, 344 of the blank 190. So the moulding face 255 of the base may contact one side face 343, and the diagonally opposite moulding face 256 of the lid may contact the other side face 344.

By way of example, the lower face 342 of the blank 190 may be contacted by the moulding face 254 of the base 251; and the upper face 341 of the blank 190 may be contacted by the diagonally opposite moulding face 257 of the lid 252. The base 251 may thereby mould both the minor face 196b of the second end portion and the major face 194a of the first end portion, and the lid 252 may mould the major face 194b of the second end portion and the minor face 196a of the first end portion.

The split line between the base 251 and the lid 252 substantially coincides with a diagonal of the quadrilateral cross-section of the blank 190, which is its maximum cross-sectional dimension. This diagonal split mould arrangement thereby has an intrinsic draw angle which enables the cured blank 190 to be removed from the mould in its final shape—not requiring any machining after it has been removed from the mould, unlike the arrangement of FIG. 16. The diagonal split mould thereby removes a need for additional machining of the blank or inserts before use in a blade root 20 lay-up.

The mould cavity of the diagonal split mould 250 of FIG. 27 therefore preferably has a trapezoid cross-section at each end, so the end portions of the moulded and cured blank 190 have the described trapezoid cross-sections. In a further alternative moulding arrangement, the mould cavity of the diagonal split mould 250 of FIG. 27 may have a square or rectangular cross-sectional shape rather than double-trapezoid. The moulded and cured blank may then be then machined to give it the double-trapezoid shape shown in FIGS. 17-23 before it is cut diagonally to provide the matching pair of inserts, although this variant is not preferred.

Figures 28, 29:
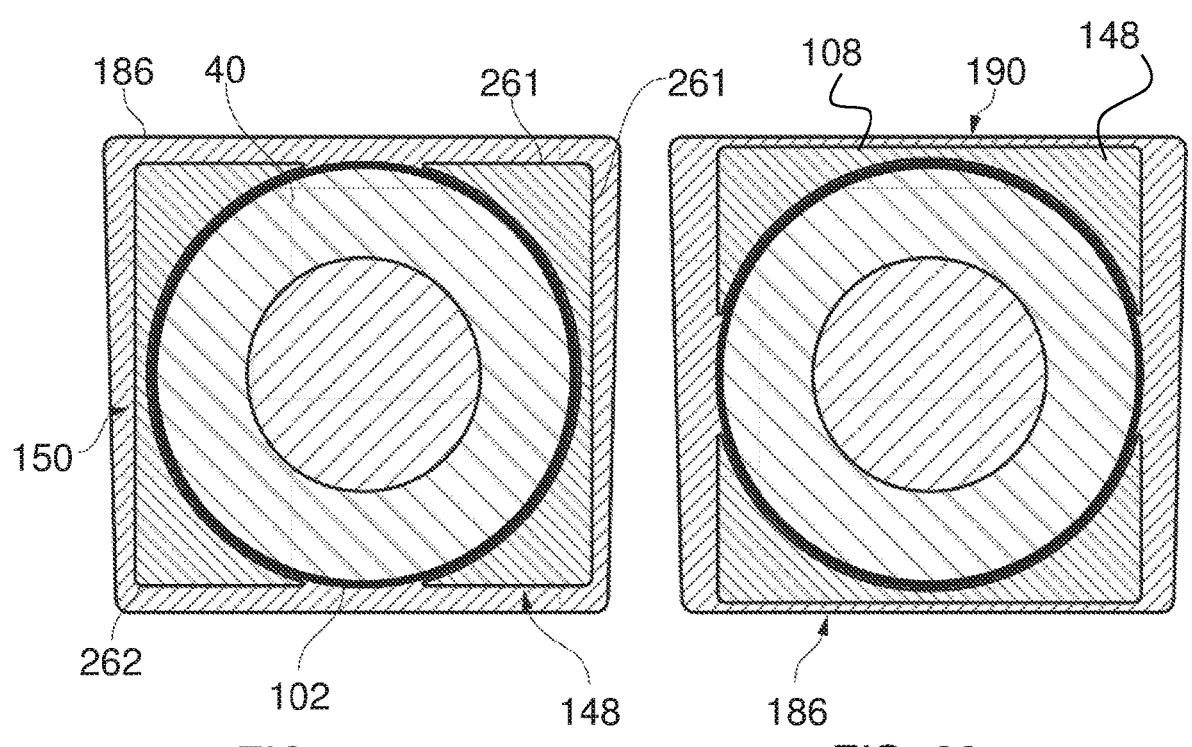
FIG. 28 shows a cross-section through a first lobed batten arrangement.
FIG. 29 shows a cross-section through a second lobed batten arrangement.

FIG. 14 shows a two-batten arrangement in which each batten 148 optionally has a pair of lobes. The lobes may be formed from pultruded fibrous preforms 150 or e.g. formed by glass fibre rods 160. FIGS. 28 and 29 show similar lobed batten arrangements formed from pultruded preforms 150.

According to an embodiment illustrated in FIG. 28, the two preforms 150 may have first and second lobes joined by a connection portion. The lobed battens 148 may be arranged on opposite sides of an assembly 120, to make up part of the body 108 of an insert 105. Still alternatively, as shown in FIG. 29, the two-lobed battens 148, in the form of preforms 150 may be arranged on the top and bottom of the assembly 120. Each lobe preferably has a deltoid cross-section with a concave inner face which contacts the transition layer 102, and a pair of outer faces 261 which meet at a convex corner 262.

The battens 148 may extend along the full length of a bushing and core 62 up to the root end of the bushing 40. FIG. 30 shows an example of such an arrangement. In this case the bushing 40 may have undulations formed along its full length, unlike in the embodiment of FIG. 6a in which the bushing has a root end region 61 with a smooth cylindrical outer surface with no undulations.

It may be desirable to axially separate the functions of, on the one hand, transferring loads between a hub connection bolt and a bushing 40, and on the other hand, transferring loads between a bushing 40 and an insert body 108. Therefore, it may be desirable to axially offset the position of a thread 66, or other connection feature inside a bore 109 of a bushing 40, from the transition layer 102, which provides anchoring between the bushing and the insert body 108. To this end, as discussed the transition layer 102 may terminate axially inboard of a root end face of a bushing 40. At the same time, a thread 66 or other connection feature inside a bore 109 may be positioned at an end region of the bushing 40 axially offset from the transition layer 102. At the same time, in embodiments, the battens 148 may terminate at the end of the body region 59 where it meets the end region 61. In particular, the battens 148 in the body 108 of an insert blank 190 may terminate short of a root face end 232 of an insert or bushing 40. In this case, one-piece, flexible end caps 310 may be fitted over the end regions 61. The end caps may in particular have the required square or trapezoidal outer profile of the insert body 108. In embodiments, preferably, the trapezoid cross-section shape of the insert body 108 may have an axis of symmetry extending perpendicular to its parallel sides.

Figure 31:
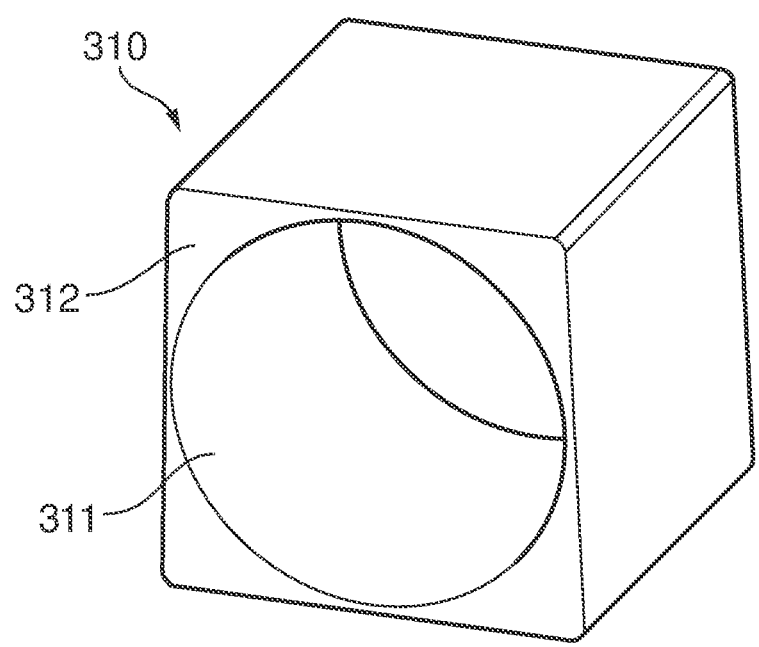
FIG. 31 is an isometric view of an end cap.

An example of such an end cap 310 is shown in FIG. 31. The illustrated end cap 310 may have four corner lobes 312 with the required deltoid cross-section, and a bore with a smooth cylindrical inner surface 311 which abuts the smooth cylindrical outer surface of the bushing end region 61. The end cap 310 may prevents the ingress of water or oil into the insert body 108.

Preferably, the end cap 310 may be formed from a low modulus plastic material. For example the end cap 310 may be formed from a material with a modulus less than 1 GPa, which is much less than the modulus of the battens 148 (typically of the order of 40 GPa). The relatively low modulus of the end cap 310 ensures a simple stress field with the primary load path from the internal thread 66 into the battens 148 being via the body region 59 and the transition layer 102, and not via the end cap 310. The end cap 310 may optionally be glued in place.

Figure 33:
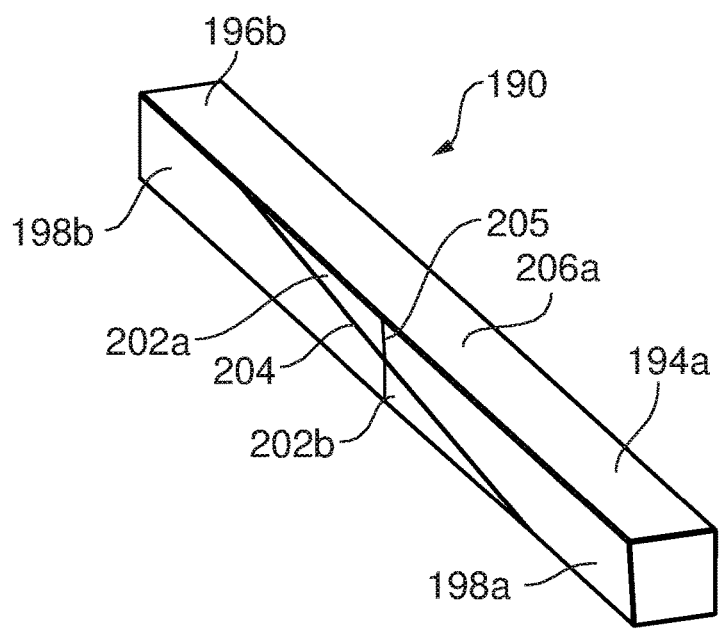
FIG. 33 shows an isometric view showing the outer profile of a blank with an alternative geometry.

FIG. 33 shows a blank 190 with a further alternative geometry. In the embodiment illustrated in FIG. 33, each triangular facet 202a,b may run along only half the length of the transition portion 200 up to a vertical edge 205.

The term trapezoid in the present context denotes a quadrilateral shape having a pair of parallel sides and a pair of non-parallel sides.

Although the invention has been described above with reference to one or more preferred embodiments, it will be appreciated that various changes or modifications may be made without departing from the scope of the invention as defined in the appended claims.

The invention claimed is:

1. An insert for a wind turbine blade root, the insert comprising:
    an end portion comprising a bushing with a threaded bore, wherein the end portion has peripheral faces which form a cross-section, the peripheral faces including a major face, a minor face and a pair of side faces, the major face being wider than the minor face; and
    an extension portion which extends away from the end portion to a tip, wherein the extension portion has an outer face which meets the major face of the end portion, an inner face which meets the minor face of the end portion, a pair of side faces which meet the side faces of the end portion,
    wherein a height between the inner face and outer face decreases as it extends away from the end portion,
    wherein a width of the outer face decreases as the extension portion extends away from the end portion, and
    wherein the width of the outer face at the end portion is larger than the width of the outer face at the tip.

2. The insert according to claim 1, wherein the height decreases uniformly as the extension portion extends away from the end portion.

3. The insert according to claim 1, wherein the inner face is planar.

4. The insert according to claim 1, wherein each side face of the insert comprises one or more substantially planar facets.

5. The insert according to claim 1, wherein a cross-section of said insert is a quadrilateral.

6. The insert according to claim 1, wherein the width decreases uniformly as the extension portion extends away from the end portion.

7. The insert according to claim 1, wherein an angle of taper between the outer face and the inner face of the extension portion is between 2 degrees and 20 degrees.

8. The insert according to claim 7, wherein the angle of taper is approximately 6 degrees.

9. A wind turbine blade comprising: a root and a tip, the wind turbine blade extending from the root to the tip; and a plurality of inserts according to claim 1 embedded in the root.

* * * * *